(12) United States Patent
Toth et al.

(10) Patent No.: US 10,958,639 B2
(45) Date of Patent: *Mar. 23, 2021

(54) PREVENTING UNAUTHORIZED ACCESS TO SECURE INFORMATION SYSTEMS USING MULTI-FACTOR, HARDWARE BASED AND/OR ADVANCED BIOMETRIC AUTHENTICATION

(71) Applicant: Bank of America Corporation, Charlotte, NC (US)

(72) Inventors: Michael Toth, Charlotte, NC (US); Hitesh Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 393 days.

This patent is subject to a terminal disclaimer.

(21) Appl. No.: 15/906,510

(22) Filed: Feb. 27, 2018

(65) Prior Publication Data
US 2019/0268329 A1    Aug. 29, 2019

(51) Int. Cl.
*H04L 29/06*    (2006.01)
*G06F 21/35*    (2013.01)
(Continued)

(52) U.S. Cl.
CPC .......... *H04L 63/0853* (2013.01); *G06F 1/163* (2013.01); *G06F 21/35* (2013.01);
(Continued)

(58) Field of Classification Search
CPC ... H04L 63/08; H04L 63/0853; H04L 63/102; H04L 2463/082; G06F 1/163; G06F 21/31; G06F 21/34; G06F 21/35; H04W 8/005

See application file for complete search history.

(56) References Cited

U.S. PATENT DOCUMENTS 6,819,219 B1    11/2004  Bolle et al.
7,249,263 B2    7/2007   Chaudhari et al.
(Continued)

OTHER PUBLICATIONS

Jan. 13, 2020—(US) Non-Final Office Action—U.S. Appl. No. 15/906,455.
(Continued)

*Primary Examiner* — Eric W Shepperd
(74) *Attorney, Agent, or Firm* — Banner & Witcoff, Ltd.; Michael Springs

(57) ABSTRACT

Systems for providing secure access to systems are provided. A computing device may receive a request to access functionality which may include login credentials of a user. Upon receiving the request to access functionality, the computing device may execute a scan of an area surrounding the computing device to detect any wearable devices within proximity of the computing device that are linked to the computing device. The authenticating information and, in some examples, detected, linked wearable device, may be validated. Based on the validation, authentication response data may be generated and transmitted to an authentication computing platform which may cause the authentication computing platform to validate the authentication response data and cause the computing device to connect to a client interface computing platform. After a connection between the computing device and client interface computing platform is established, interface data may be transmitted from the client interface computing platform to the computing device and one or more interfaces may be displayed on the computing device.

21 Claims, 22 Drawing Sheets

(51) Int. Cl.
    *G06F 1/16* (2006.01)
    *H04W 8/00* (2009.01)

(52) U.S. Cl.
    CPC ........ *H04L 63/083* (2013.01); *H04L 63/0861* (2013.01); *H04L 63/102* (2013.01); *H04L 2463/082* (2013.01); *H04W 8/005* (2013.01)

(56) References Cited

U.S. PATENT DOCUMENTS

| | | | | |
|---|---|---|---|---|
| 7,360,248 | B1* | 4/2008 | Kanevsky | G06F 21/31 726/21 |
| 9,185,095 | B1 | 11/2015 | Moritz et al. | |
| 9,801,066 | B1 | 10/2017 | Hanley et al. | |
| 10,075,846 | B1 | 9/2018 | Acar et al. | |
| 2009/0150320 | A1* | 6/2009 | Geppert | G06F 21/31 706/47 |
| 2010/0063935 | A1* | 3/2010 | Thomas | G06Q 20/4014 705/325 |
| 2010/0115610 | A1 | 5/2010 | Tredoux et al. | |
| 2013/0267204 | A1 | 10/2013 | Schultz et al. | |
| 2014/0273961 | A1* | 9/2014 | Narendra | H04L 9/3231 455/411 |
| 2014/0279528 | A1 | 9/2014 | Slaby et al. | |
| 2014/0292481 | A1* | 10/2014 | Dumas | G07C 9/00571 340/5.61 |
| 2014/0337634 | A1 | 11/2014 | Starner et al. | |
| 2014/0341441 | A1 | 11/2014 | Slaby et al. | |
| 2015/0035643 | A1 | 2/2015 | Kursun | |
| 2015/0046990 | A1 | 2/2015 | Oberheide et al. | |
| 2015/0140934 | A1* | 5/2015 | Abdurrahman | H04W 4/70 455/41.2 |
| 2015/0208226 | A1* | 7/2015 | Kuusilinna | H04W 4/21 455/414.3 |
| 2015/0235017 | A1 | 8/2015 | Oberheide et al. | |
| 2015/0242601 | A1* | 8/2015 | Griffiths | G06F 21/31 726/5 |
| 2015/0278498 | A1* | 10/2015 | Hong | G06F 21/35 340/5.82 |
| 2015/0332075 | A1* | 11/2015 | Burch | G06F 1/1696 345/156 |
| 2016/0042170 | A1* | 2/2016 | Farraro | G06F 21/40 726/20 |
| 2016/0057139 | A1* | 2/2016 | McDonough | H04L 67/02 726/6 |
| 2016/0071343 | A1* | 3/2016 | Agrafioti | G07C 9/37 340/5.52 |
| 2016/0154952 | A1* | 6/2016 | Venkatraman | G06Q 20/3278 705/44 |
| 2016/0166936 | A1 | 6/2016 | Millegan et al. | |
| 2016/0180068 | A1 | 6/2016 | Das et al. | |
| 2016/0180150 | A1 | 6/2016 | Negi et al. | |
| 2016/0232758 | A1* | 8/2016 | Fletcher | G08B 21/0247 |
| 2016/0299779 | A1* | 10/2016 | Kulkarni | H04L 63/0492 |
| 2016/0316371 | A1* | 10/2016 | Chen | H04L 67/10 |
| 2016/0342784 | A1 | 11/2016 | Beveridge et al. | |
| 2017/0010665 | A1 | 1/2017 | Tanaka et al. | |
| 2017/0230335 | A1* | 8/2017 | Walker | H04L 63/0861 |
| 2018/0049020 | A1* | 2/2018 | Fujino | H04W 12/06 |
| 2018/0293367 | A1 | 10/2018 | Urman | |
| 2018/0351962 | A1* | 12/2018 | Kulkarni | H04L 63/105 |
| 2019/0028485 | A1* | 1/2019 | Baird | H04L 63/083 |
| 2019/0044942 | A1 | 2/2019 | Gordon et al. | |
| 2019/0114404 | A1* | 4/2019 | Nowak | G06F 21/316 |
| 2019/0199715 | A1 | 6/2019 | May | |
| 2019/0303945 | A1* | 10/2019 | Mitra | G06Q 20/3278 |

OTHER PUBLICATIONS

Apr. 28, 2020—(US) Final Office Action—U.S. Appl. No. 15/906,455.
Aug. 11, 2020—(US) Non-Final Office Action—U.S. Appl. No. 15/906,455.

* cited by examiner

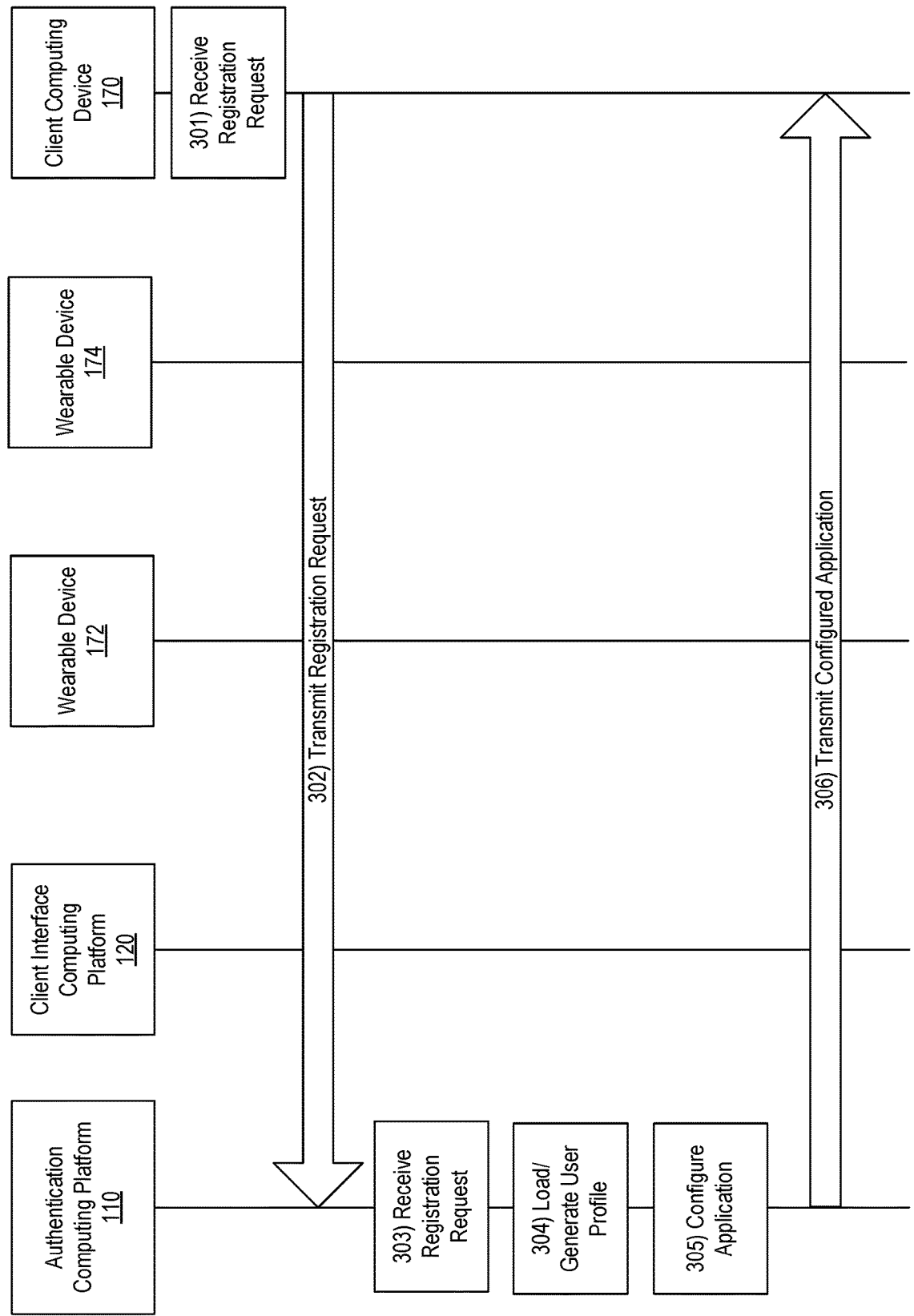

PREVENTING UNAUTHORIZED ACCESS TO SECURE INFORMATION SYSTEMS USING MULTI-FACTOR, HARDWARE BASED AND/OR ADVANCED BIOMETRIC AUTHENTICATION

BACKGROUND

Aspects of the disclosure relate to electrical computers and systems. In particular, one or more aspects of the disclosure relate to using advanced biometric and/or multi-factor, hardware-based techniques to authenticate a user, provide access to functionality, or the like.

Controlling access to secure systems is an important function in the business world. Unauthorized users are constantly finding more creative ways to obtain user login information and/or otherwise gain access to secure systems and the personal information stored thereon. Conventional systems often rely on traditional credentials, such as a username and password combination to enable access for a user. However, these traditional credentials can often be falsified or obtained by unauthorized users to perform unauthorized activity.

Some conventional systems rely on traditional biometric data, such as a fingerprint, to authenticate a user. However, fingerprint data can also be falsified or obtained without the authorization of a user. Accordingly, it would be advantageous to increase the technical complexity associated with authenticating a user, such as by providing multi-factor hardware-based and/or advanced biometric arrangements as discussed herein, in order to prevent access to unauthorized users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing secure access to systems and preventing unauthorized access to secure systems.

In some examples, a system, computing platform, computing device, or the like, may receive a request to access functionality. The request to access functionality may include login credentials of a user, such as username, password, personal identification number (PIN), traditional biometric data, and the like. In some examples, upon receiving the request to access functionality, the computing device may execute a scan of an area surrounding the computing device to detect any wearable devices within proximity of the computing device that are linked to the computing device. In some examples, a first wearable device that is linked to the computing device may be detected.

In some arrangements, the authenticating information and, in some examples, linked wearable device, may be validated. Based on the validation, authentication response data may be generated and transmitted to an authentication computing platform. In some arrangements, transmitting the authentication response data may cause the authentication computing platform to validate the authentication response data and cause the computing device to connect to a client interface computing platform.

In some examples, after a connection between the computing device and client interface computing platform is established, interface data may be transmitted from the client interface computing platform to the computing device and one or more interfaces may be displayed on the computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3H depict an illustrative event sequence for implementing multi-factor, hardware-based functions for preventing unauthorized access to systems in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using dynamic authentication to prevent unauthorized access to secure information systems and functionality associated therewith.

As mentioned above, preventing unauthorized users from accessing functionality is an important technical challenge. Conventional systems often rely on authenticating data such as login credentials when determining whether to provide access and/or functionality to a user. However, many unauthorized users are obtaining user credentials without the knowledge of an authorized user. Accordingly, in conventional systems that rely solely on user credentials to determine whether a user is authorized or unauthorized, even an unauthorized user with appropriate credentials can access functionality.

As discussed herein, various arrangements including using machine learning to determine whether a user is authorized or unauthorized (e.g., prior to authenticating the user). Accordingly, if an unauthorized user has authentic credentials, he or she may still be identified as unauthorized (e.g., based on internet protocol address, location, number of attempted logins, or the like). In some examples, unauthorized users may be presented with a decoy user interface (e.g., rather than a notification that credentials do not match, that a device is not recognized, or other indicator that the user is not in a recognized pattern). The decoy user interface may have functionality disabled, may have decoy functionality enabled, may provide decoy information (e.g., information other than accurate information presented in an authentic user interface), or the like.

In some arrangements, user selections made from the decoy interface may be collected and analyzed to update and/or validate one or more machine learning datasets, aid in more efficient and accurate identification of unauthorized users, anticipate unauthorized activity in order to mitigate or avoid damage to an authorized user, and the like.

These and various other arrangements will be discussed more fully below.

Figure 1A:
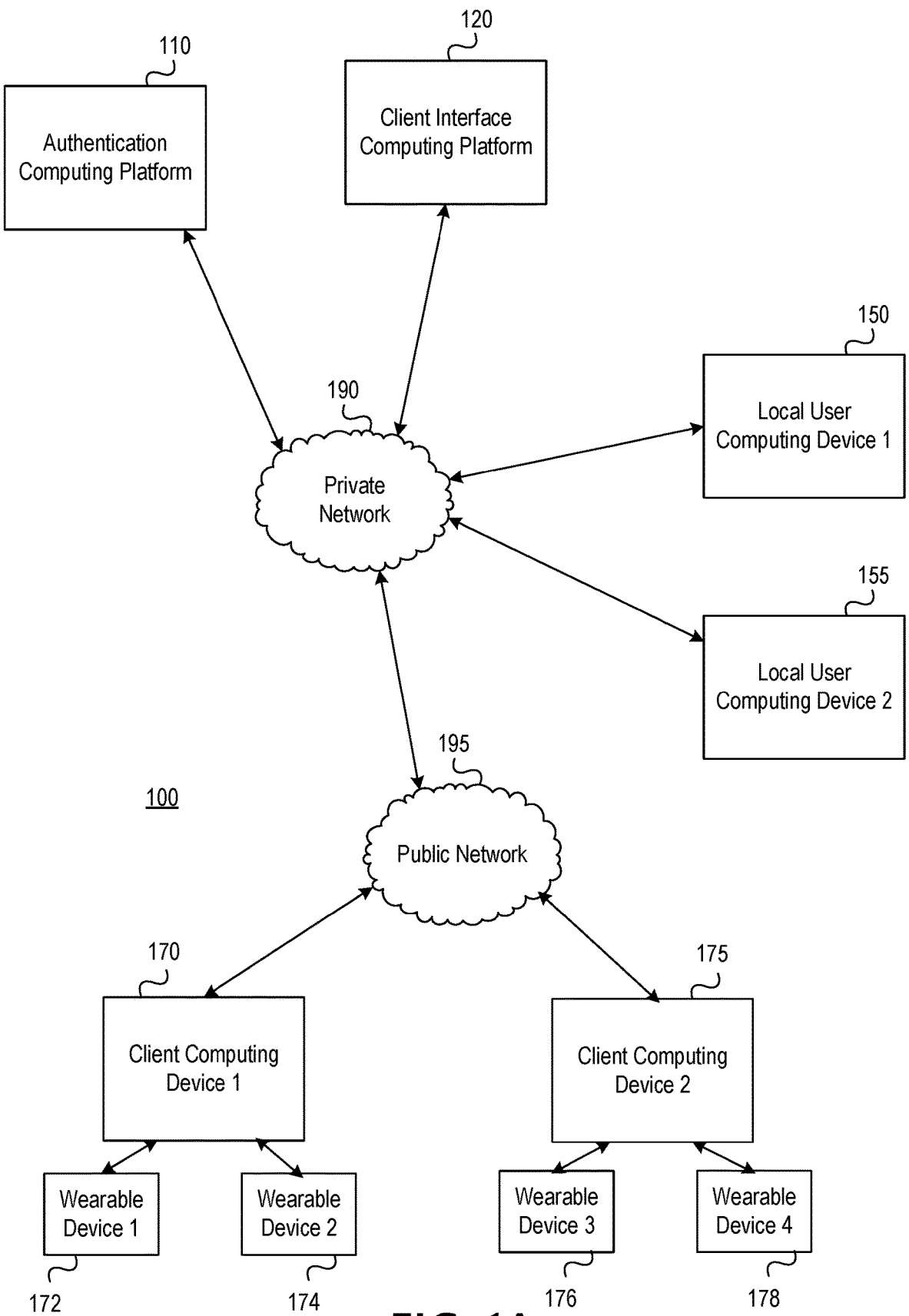
FIGS. 1A-1C depict an illustrative computing environment for implementing multi-factor, hardware-based and/or advanced biometric functions for preventing unauthorized access to systems in accordance with one or more aspects described herein.
Figure 1B:
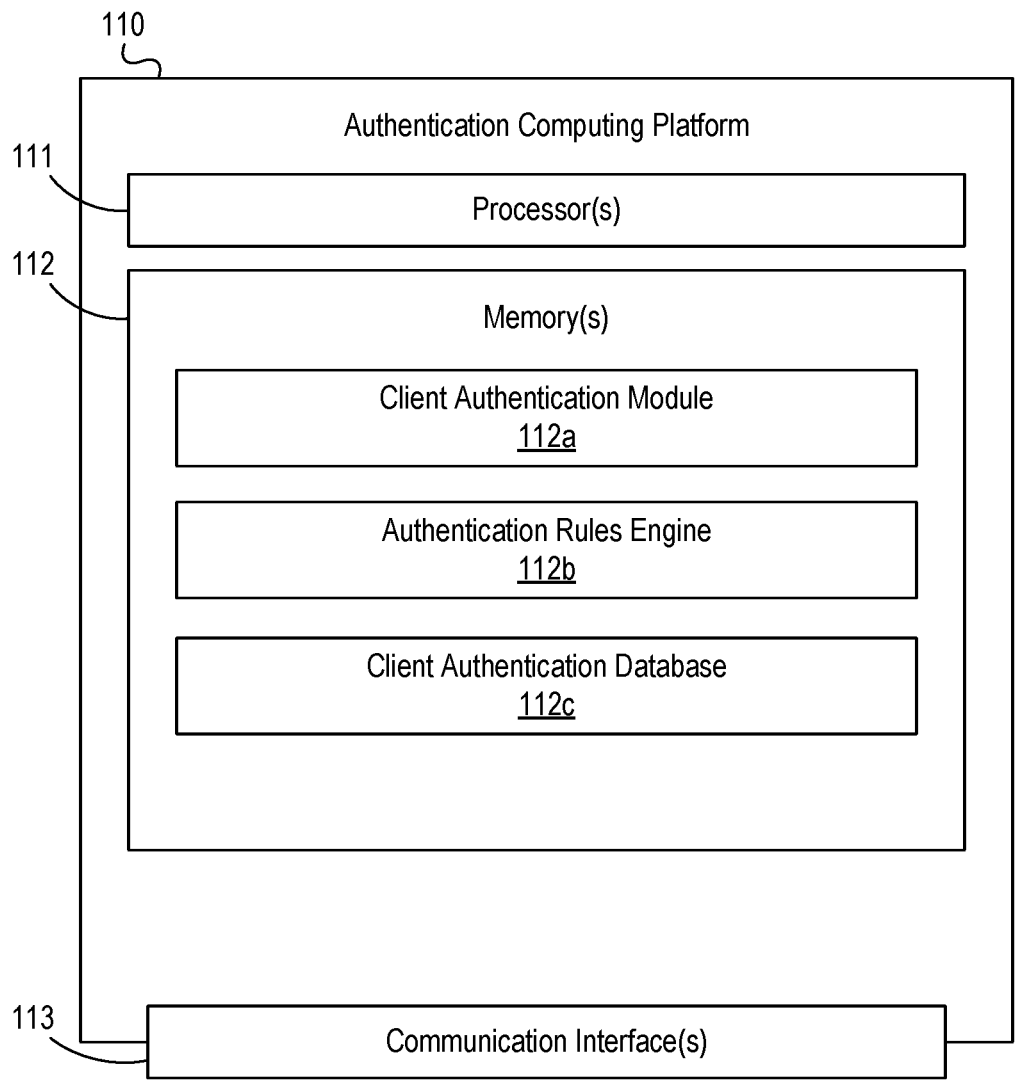

FIGS. 1A and 1B depict an illustrative computing environment for implementing and using a system for preventing unauthorized access to systems by implementing multi-factor and advanced biometric authentication functions in accordance with one or more aspects described herein. Referring to FIG. 1A, computing environment 100 may include one or more computing devices and/or other computing systems. For example, computing environment 100 may include an authentication computing platform 110, a client interface computing platform 120, a first local user computing device 150, a second local user computing device 155, a first client computing device 170, a second client computing device 175, a first wearable device 172, a second wearable device 174, a third wearable device 176 and a fourth wearable device 178. Although two local user computing devices, two client computing devices and two wearable devices associated with each client computing device are shown, more or fewer devices may be included without departing from the invention.

Authentication computing platform 110 may be configured to provide client authentication functions. In some examples, a user may request access to an application executing on a client computing device 170, 175. The user request may include credentials, such as a username, password, personal identification number, biometric data such as fingerprint, or the like. The authentication computing platform 110 may evaluate the user credentials, as well as additional authenticating information, such as a wearable device 172, 174, 176 and/or 178 being within a predefined proximity of the client computing device 170, 175. If the user is authenticated, a command to connect the user computing device to the client interface computing platform 120 may be transmitted to provide access to data provided by the client interface computing platform 120 via the client computing device 170, 175.

In some examples, advanced biometric data may also be used to authenticate the user and may be validated by the authentication computing platform 110. For instance, data may be retrieved from a wearable device 172, 174, 176, 178 of a user and advanced biometric data, such as a user's gait, heart rate, breaths per minute, or the like, may be used to authenticate the user. In some examples, advanced biometric data may further include voice recognition. In some arrangements, validating the authentication information may be performed without prompting the user for any additional information. For instance, upon requesting access (e.g., inputting login credentials), the system may automatically scan for wearable device(s) 172, 174, 176, 178 within proximity, retrieve biometric data, and the like.

Client interface computing platform 120 may be configured to configure data for presentation via one or more user interfaces associated with an application executing on a client computing device 170, 175. For instance, the client interface computing platform 120 may store client data, interface configuration data, and the like. Upon connecting to the user computing device 170, 175, the client interface computing platform 120 may generate one or more interfaces, configure one or more interfaces, transmit one or more interfaces for display, and the like.

Local user computing device 150, 155 and client computing device 170, 175 may be configured to communicate with and/or connect to one or more computing devices or systems shown in FIG. 1A. For instance, local user computing device 150, 155 may communicate with one or more computing systems or devices via network 190, while client computing device 170, 175 may communicate with one or more computing systems or devices via network 195. In some examples, local user computing device 150, 155 may be used to control aspects associated with authenticating a user, configuring data and or user interfaces to present to the user, generating user interfaces, analyzing biometric and wearable device data, and the like.

The client computing devices 170, 175 may be used to communicate with, for example, authentication computing platform 110, client interface computing platform 120, wearable devices 172, 174, 176, and/or 178. For instance, client computing device 170, 175 may receive a request to access an application executing or launched on the client computing device 170, 175. Client computing device 170, 175 may analyze received login credentials, validate login credentials, validate wearable devices within proximity of the client computing device 170, 175, receive and/or analyze biometric data from one or more wearable devices 172, 174, 176, 178, or the like. Further, client computing devices 170, 175 may display one or more user interfaces for accessing the application executing on the client computing device 170, 175. For instance, an online or mobile banking application may execute on the client computing device 170, 175 and one or more interactive user interfaces may be displayed on client computing device 170, 175.

Wearable device 172, 174, 176, and/or 178 may include a type of wearable device. For instance, wearable device 172 may be a wearable computing device (e.g., smart watch, fitness tracker, augmented reality glasses, on-board vehicle computer or control system, electronic necklace, electronic belt, electronic ring, electronic bracelet, heart rate monitor, walking gait sensor, intelligent clothing (e.g., running attire, yoga attire, or the like) configured to measure and/or monitor heat exchange or body temperature, and the like) that may be linked to and/or used by the first user of client computing device 170. Wearable device 174 may be a wearable computing device (e.g., smart watch, fitness tracker, augmented reality glasses, on-board vehicle computer or control system, electronic necklace, electronic belt, electronic ring, electronic bracelet, heart rate monitor, walking gait sensor, and the like) that may be linked to and/or used by the first user of client computing device 170.

Wearable device 176 may be a wearable computing device (e.g., smart watch, fitness tracker, augmented reality glasses, electronic necklace, electronic belt, electronic ring, electronic bracelet, heart rate monitor, walking gait sensor, and the like) that may be linked to and/or used by the first user of client computing device 175. Wearable device 178 may be a wearable computing device (e.g., smart watch, fitness tracker, augmented reality glasses, electronic necklace, electronic belt, electronic ring, electronic bracelet, heart rate monitor, walking gait sensor, intelligent clothing (e.g., running attire, yoga attire, or the like) configured to measure and/or monitor heat exchange or body temperature, and the like) that may be linked to and/or used by the first user of client computing device 175.

In one or more arrangements local user computing device 150, local user computing device 155, client computing device 170, and/or client computing device 175 may be any type of computing device or combination of devices capable of performing the particular functions described herein. For example, local user computing device 150, local user computing device 155, client computing device 170, and/or client computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of local user computing device 150, local user computing device 155, client computing device 170, and/or client computing device 175 may, in some instances, be special-purpose computing devices configured to perform specific functions.

Computing environment 100 also may include one or more computing platforms. For example, and as noted above, computing environment 100 may include authentication computing platform 110 and client interface computing platform 120. As illustrated in greater detail below, authentication computing platform 110 and client interface computing platform 120 may include one or more computing devices configured to perform one or more of the functions described herein. For example, authentication computing platform 110 and client interface computing platform 120 may include one or more computers (e.g., laptop computers, desktop computers, servers, server blades, or the like).

As mentioned above, computing environment 100 also may include one or more networks, which may interconnect one or more of authentication computing platform 110, client interface computing platform 120, local user computing device 150, local user computing device 155, client computing device 170, client computing device 175, wearable device 172, wearable device 174, wearable device 176, and/or wearable device 178. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, authentication computing platform 110, client interface computing platform 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect authentication computing platform 110, client interface computing platform 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., authentication computing platform 110, client interface computing platform 120, local user computing device 150, and/or local user computing device 155 with one or more networks and/or computing devices that are not associated with the organization. For example client computing device 170, client computing device 175, wearable device 172, wearable device 174, wearable device 176, and/or wearable device 178 might not be associated with an organization that operates private network 190 (e.g., because client computing device 170, client computing device 175, wearable device 172, wearable device 174, wearable device 176, and/or wearable device 178 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect client computing device 170, client computing device 175, wearable device 172, wearable device 174, wearable device 176, and/or wearable device 178 to private network 190 and/or one or more computing devices connected thereto (e.g., authentication computing platform 110, client interface computing platform 120, local user computing device 150, local user computing device 155).

Referring to FIG. 1B, authentication computing platform 110 may include one or more processors 111, memory 112, and communication interface 113. A data bus may interconnect processor(s) 111, memory 112, and communication interface 113. Communication interface 113 may be a network interface configured to support communication between authentication computing platform 110 and one or more networks (e.g., private network 190, public network 195, or the like). Memory 112 may include one or more program modules having instructions that when executed by processor(s) 121 cause authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of authentication computing platform 110 and/or by different computing devices that may form and/or otherwise make up authentication computing platform 110.

For example, memory 112 may have, store, and/or include a client authentication module 112*a*, an authentication rules engine 112*b* and a client authentication database 112*c*. Client authentication module 112*a* may have instructions that direct and/or cause authentication computing platform 110 to control access to resources of an information system by implementing multi-factor authentication based on multiple hardware devices, advanced biometrics, and the like, as discussed in greater detail below.

Authentication rules engine 112*b* may store instructions and/or data that may cause, direct or enable authentication computing platform 110 to identify one or more rule sets to implement based on, for example, a type of information requested, a type of event being processed, a type of device requesting access, or the like. The authentication rules engine 112*b* may implement the identified rule set to dynamically modify authentication requirements based on various factors, as discussed more fully herein.

Client authentication database 112*c* may store information used by client authentication module 112*a* and/or client authentication computing platform 110 in controlling access to resources of an information system by implementing multi-factor authentication using multiple hardware devices, advanced biometric authentication techniques and/or in performing other functions.

Figure 1C:
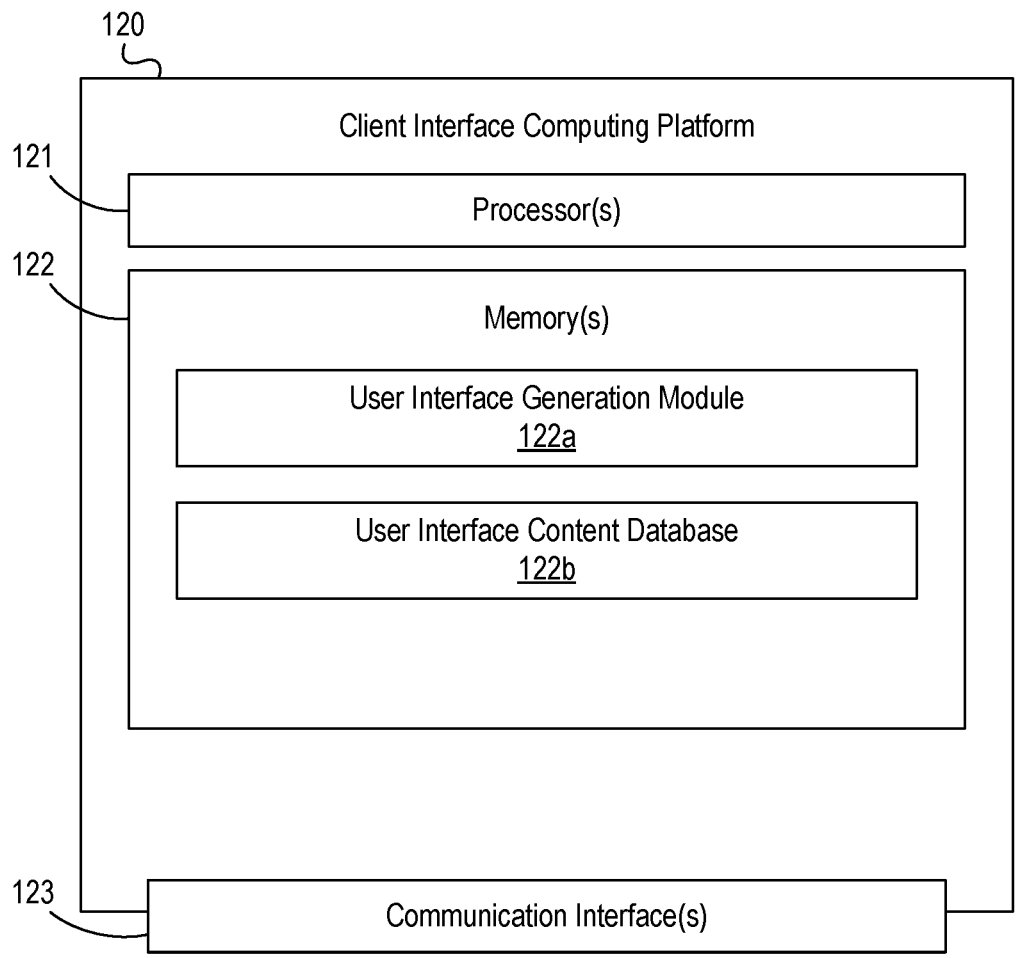

With reference to FIG. 1C, client interface computing platform 120 is provided. While the client interface computing platform 120 is shown and discussed as a device separate from authentication computing platform 110, the client interface computing platform 120 may be a part of the authentication computing platform 110, may be part of the same physical device, or the like.

Client interface computing platform 120 may include one or more processors 121, memory 122, and communication interface 123. A data bus may interconnect processor(s) 121, memory 122, and communication interface 123. Communication interface 123 may be a network interface configured to support communication between client interface computing platform 120 and one or more networks (e.g., private network 190, public network 195, or the like). Memory 122 may include one or more program modules having instructions that when executed by processor(s) 121 cause client interface computing platform 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of client interface computing platform 120 and/or by different computing devices that may form and/or otherwise make up client interface computing platform 120.

For example, memory 122 may have, store, and/or include user interface generation module 122*a* and user interface content database 122*b*. User interface generation module 122*a* may store instructions and/or data that may direct, cause or enable client interface computing platform 120 to generate or configure one or more user interfaces associated with an application executing on a client computing device 170, 175. The generated or configured user interfaces may be transmitted to client computing device 170, 175 for display to the user.

User interface content database 122*b* may store information used by user interface generation module 122*a* and/or client interface computing platform 120 in controlling information provided via one or more user interfaces.

FIGS. 2A-2E depict an illustrative event sequence for implementing and using a system for preventing unauthorized access to systems by implementing multi-factor and advanced biometric authentication functions according to aspects described herein. The events shown in the illustrative event sequence are merely one example sequence and additional events may be added, or events may be omitted, without departing from the invention.

Figure 2A:
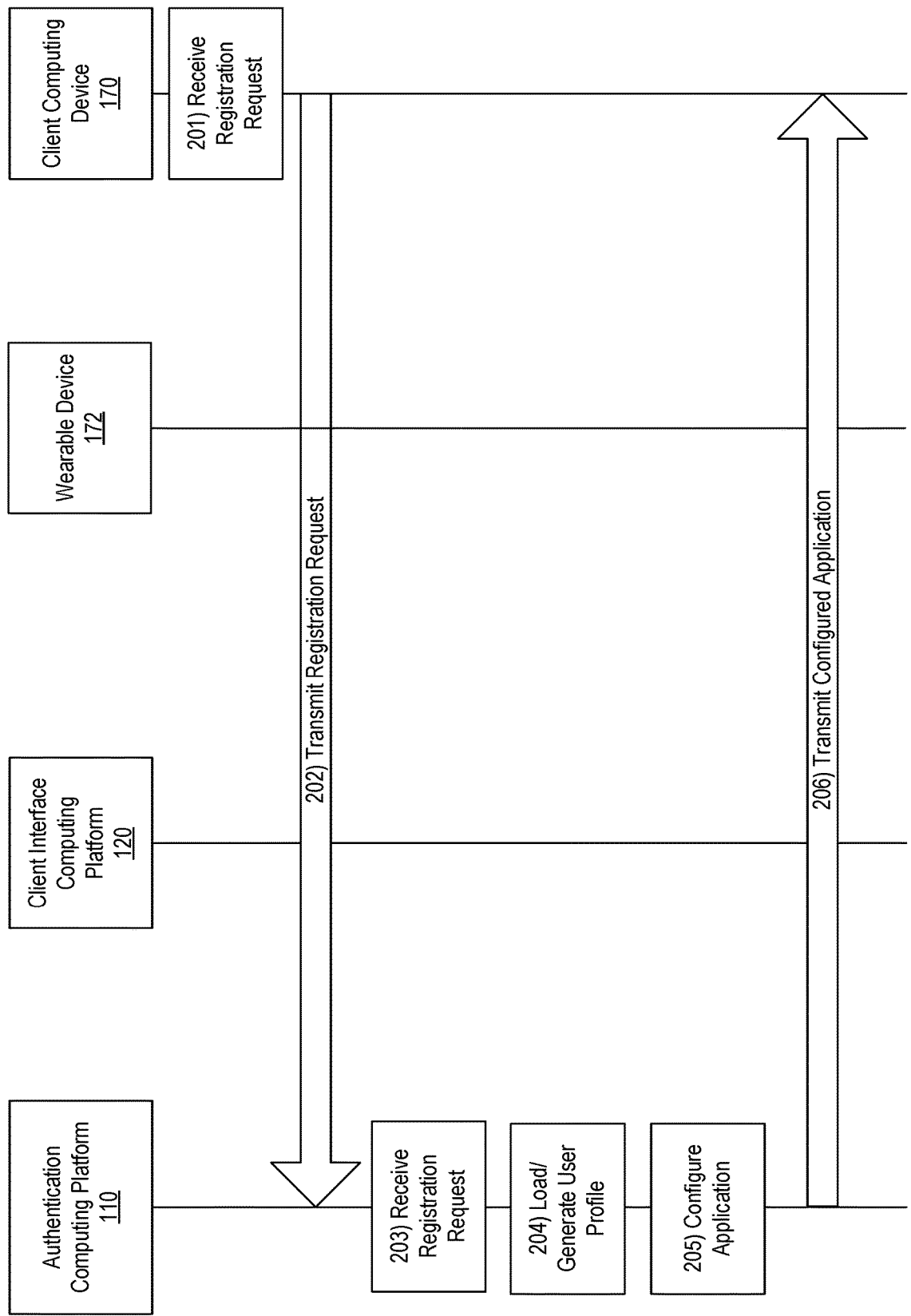
FIGS. 2A-2E depict an illustrative event sequence for implementing advanced biometric authentication functions in accordance with one or more aspects described herein.

Referring to FIG. 2A, at step 201, a request to register a device, such as a client computing device 170, 175, may be received by the computing device 170. Although device 170 is shown and described throughout FIGS. 2A-2E, device 175 or other similar client computing devices may be used without departing from the invention.

At step 202, the request may be transmitted to an authentication computing platform 110. At step 203, the registration request may be received by the authentication computing platform 110. At step 204, and in response to receiving the request for registration, the authentication computing platform 110 may load a user profile linked to client computing device 170 and/or generate a user profile if one does not already exist. In generating a user profile, authentication computing platform 110 may, in some examples, store and/or update a device identifier for the client computing device 170 and/or other information associated with the client computing device 170.

At step 205, the authentication computing platform 110 may configure a copy of an application for client computing device 170 based on the registration request received from client computing device 170. In some examples, authentication computing platform may configure a copy of a mobile banking application for client computing device 170. At step 206, the authentication computing platform 110 may transmit the configured application to client computing device 170.

Figure 2B:
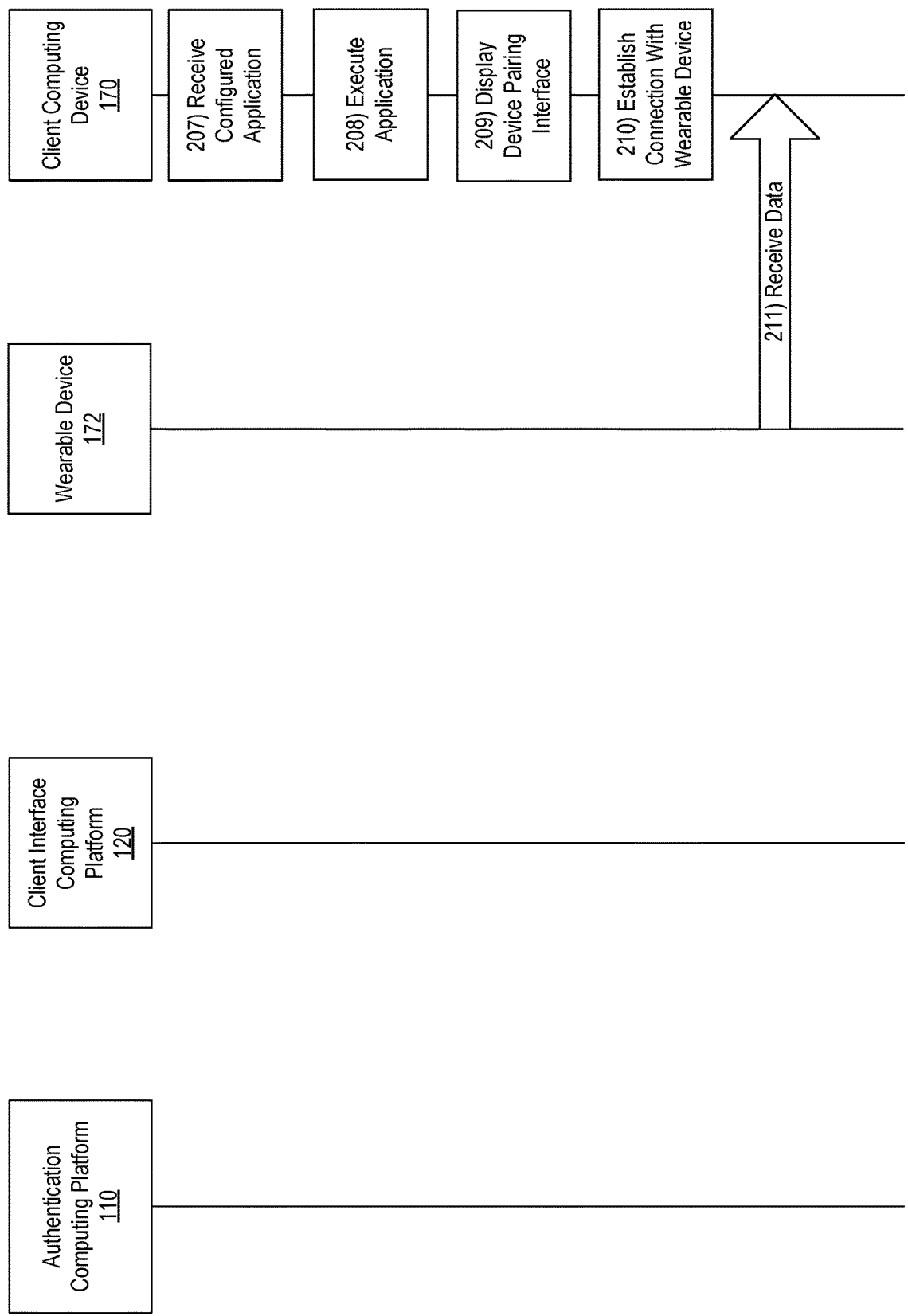

With reference to FIG. 2B, at step 207, client computing device 170 may receive the configured application from the authentication computing platform 110. For example, prior to receiving input requesting to login to a user account associated with the application (which may, e.g., be installed on the computing device, e.g., client computing device 170) client computing device 170 may receive, via a communication interface (which may, e.g., be a network interface configured to support communication between client computing device 170 and one or more networks (e.g., network 190, network 195, or the like)), from authentication computing platform 110 the application. In addition, the application received from the authentication computing platform 110 may be configured (e.g., at step 205) by the authentication computing platform for the client computing device 170.

Figure 7:
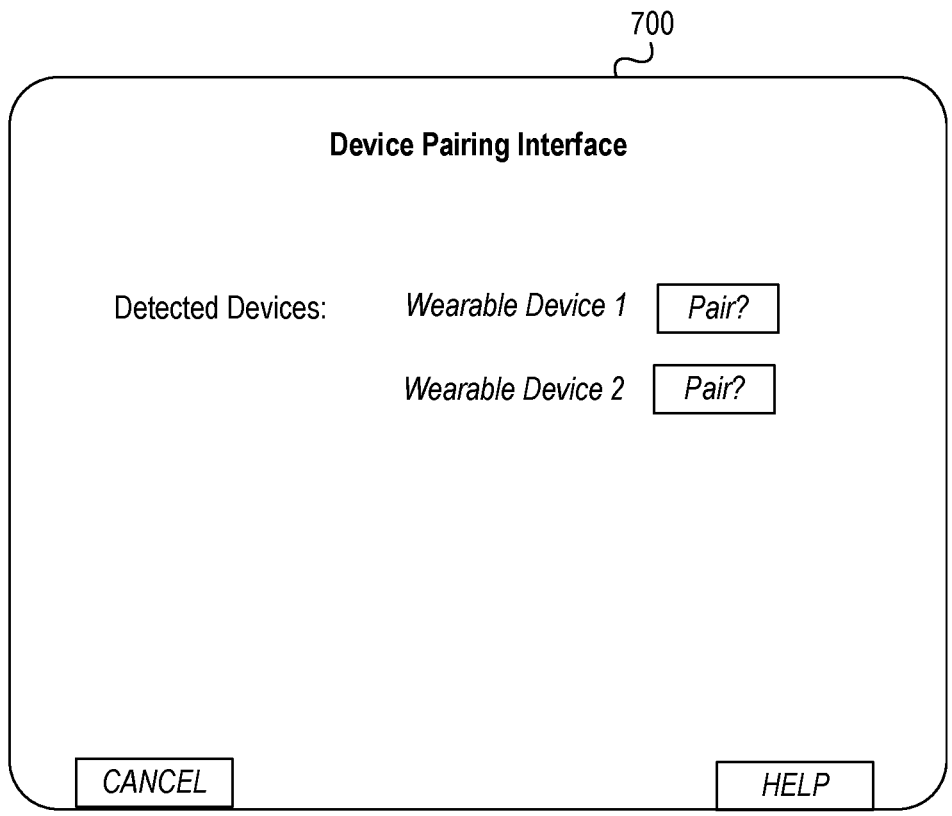
FIG. 7 illustrates one example device pairing interface in accordance with one or more aspects described herein.

At step 208, client computing device 170 may execute or launch the configured application. For example, at step 208, based on receiving the application from the authentication computing platform 110, client computing device 170 may execute or launch the application. At step 209, client computing device may display a device pairing interface. For example, at step 209, based on executing or launching the application, client computing device 170 may present (e.g., display on a display of client computing device 170) a device pairing interface. In some examples, such a device pairing interface may be presented by client computing device 170 via an operating system menu, while, in other examples, such a device pairing menu may be presenting by client computing device 170 via an application menu (e.g., the application executing on client computing device 170). In some examples, in presenting the device pairing user interface, client computing device 170 may display and/or otherwise present a graphical user interface. One example graphical user interface is shown in FIG. 7 and will be discussed more fully herein.

At step 210, client computing device 170 may establish a connection with one or more wearable devices 172, 174. For instance, at step 210, client computing device 170 may establishing a wireless data connection to a wearable device (e.g., wearable device 172) of one or more linked wearable devices (e.g., wearable device 172, wearable device 174) to link the wearable device 172 to the client computing device 170. At step 211, data may be received from the wearable device 172.

Figure 2C:
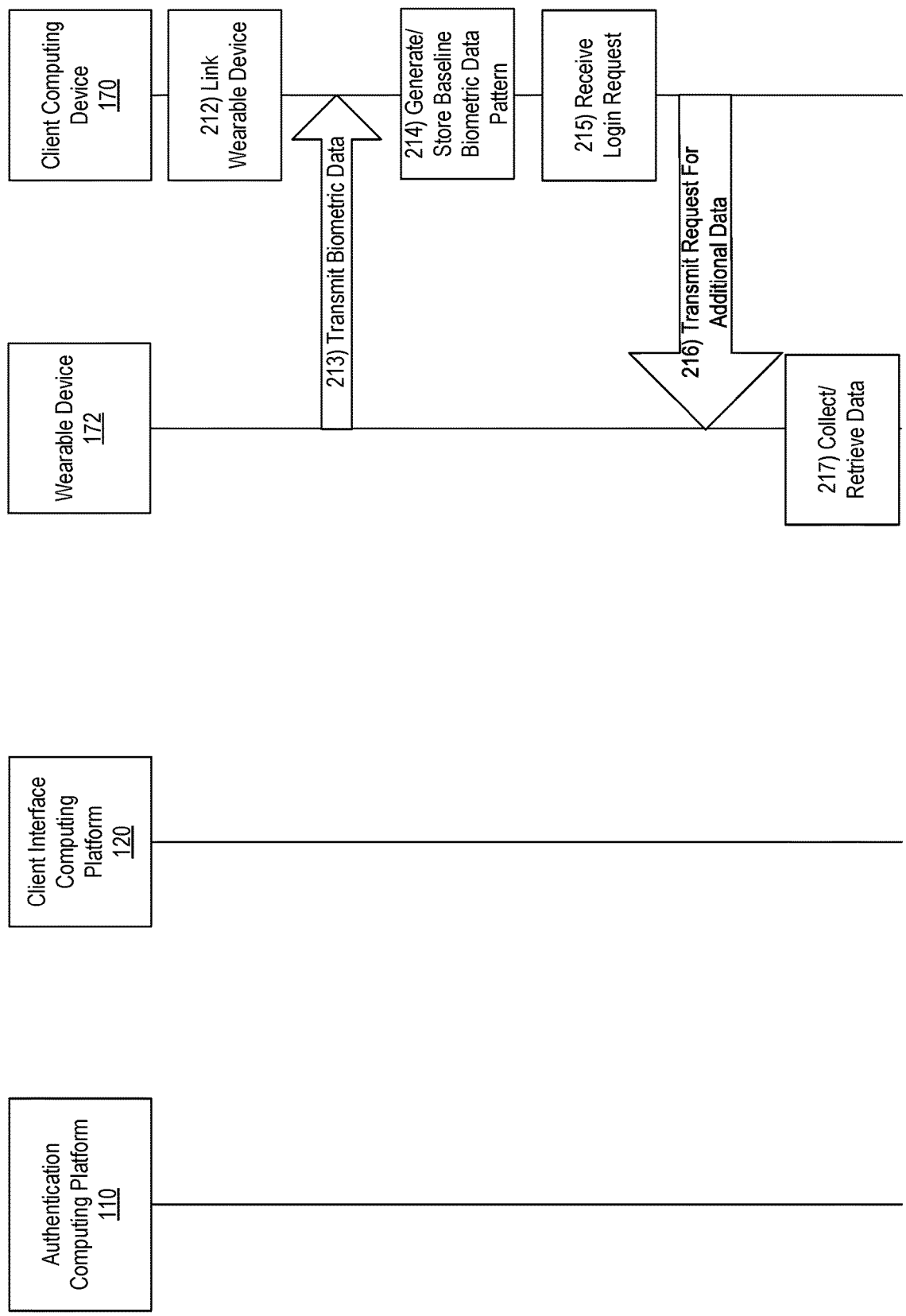
Figure 2D:
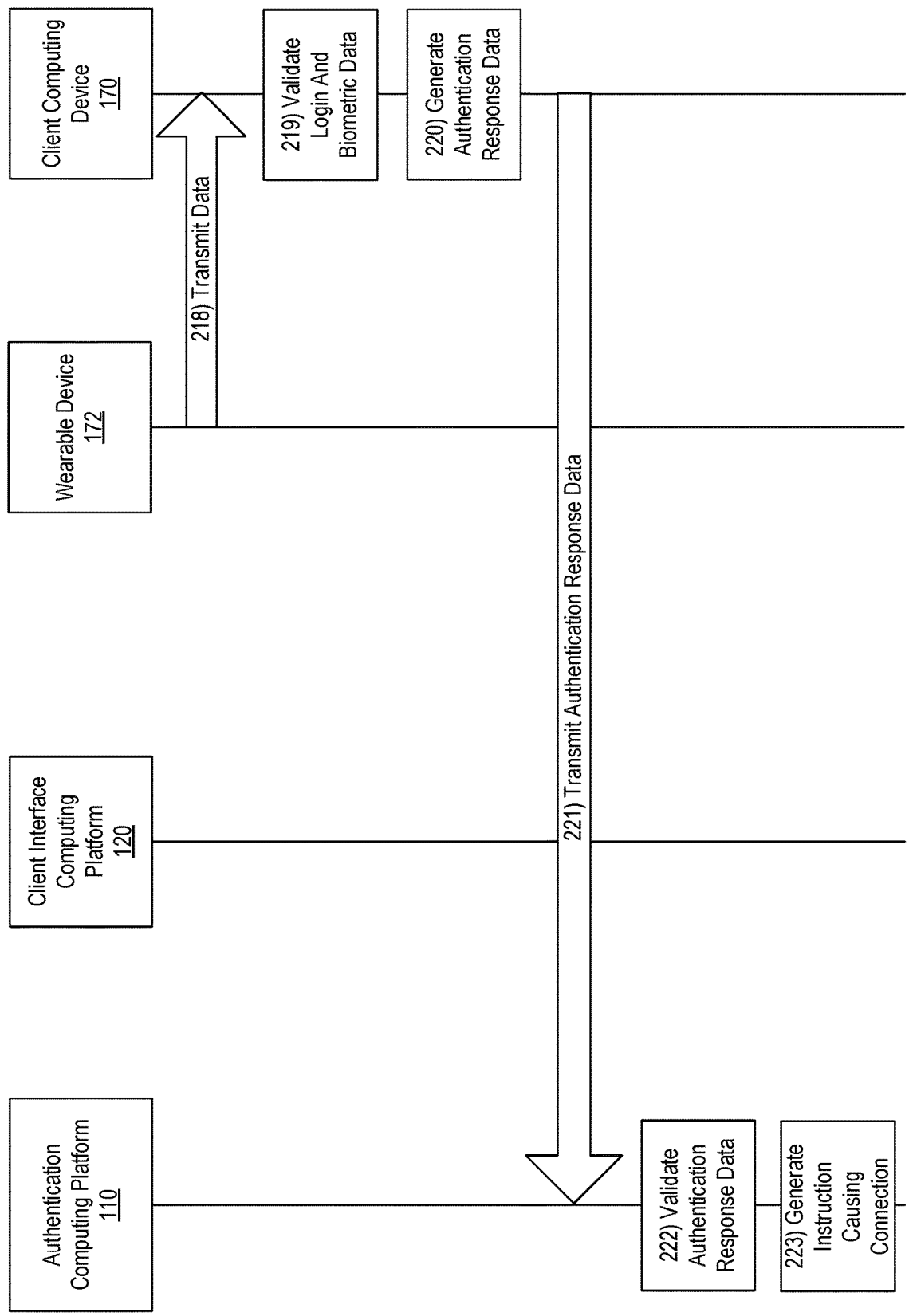

With reference to FIG. 2C, at step 212, the wearable device 172 may be linked to the client computing device 170. At step 213, data may be received by the client computing device 170 and from the wearable device 172. For example, biometric data captured or otherwise monitored by wearable device 172 in connection with a user of the wearable device (e.g., who may be wearing the wearable device 172 and also using or associated with client computing device 170). For example, while the wireless data connection is established, client computing device 170 may receive biometric data (e.g., first biometric data) from the wearable device 172 via the wireless data connection.

At step 214, the received biometric data may be used to generate (and/or store) one or more baseline biometric data patterns. For instance, the client computing device 170 may generate one or more baseline data patterns associated with user activity or other biometric data received from the wearable device 172 (e.g., via one or more sensors arranged therein) and/or data from client computing device 170 (e.g., captured using one or more biometric sensors and/or other sensors included in and/or coupled to client computing device 170). In some examples, a threshold amount of data may be received prior to generating the baseline data patterns (e.g., data associated with user activity over one hour, one day, one week, one month, or the like). The biometric data may include user gait data, heart rate data, breathing data, and/or other biometrics. This data may be used to establish a baseline against which additional biometric data may be compared to validate biometric data received to authenticate a user.

In some examples, the biometric data patterns may be stored at the client computing device 170. Additionally or alternatively, the biometric data patterns may be stored in a central storage location that may, in some examples, be cloud-based.

At step 215, the client computing device 170 may receive a request to access functionality associated with the application, a login request, or the like (e.g., may receive user input via the application executing on the client computing device). For instance, the client computing device 170 may receive user input requesting to login or otherwise access a user account associated with the application executing on the client computing device 170. In some examples, the request may include user credentials, such as a username, password, personal identification number (PIN), biometric data such as a fingerprint or iris scan, or the like.

At step 216, in response to receiving the request, and without additional user input in at least some examples, a request for additional data may be transmitted from the client computing device 170 to the wearable device 172. The request may include a request for additional biometric data. In some examples, the request may be for additional biometric data collected within a predefined time period preceding the request (e.g., within the last 1 minute, 5 minutes, 10 minutes, one hour, or the like).

In step 217, additional biometric data may be collected and/or retrieved (e.g., from internal storage, external storage in communication with the wearable device 172, or the like). In some examples, the requested additional biometric data may include advanced biometrics, such as gait information, heart rate, breathing rate, or the like.

For instance, as discussed herein, one or more hardware devices, such as a wearable device, may be used to provide one or more additional factors of authentication for a user. For instance, a computing device may detect a presence of one or more wearable devices linked to the computing device in order to authenticate a user. Additionally or alternatively, advanced biometric data, such as walking gait, heart rate, and the like, may be received from the wearable device in order to provide additional authentication.

At step 219, the client computing device 170 may validate the received login information and additional biometric data received. For instance, client computing device 170 may validate one or more of the biometric data collected and received, login credentials received, and the like, based on pre-stored data. For instance, the biometric data may be compared to one or more pre-stored baseline data patterns (as discussed herein). In another example, the login credentials may be compared to pre-stored login credentials. If the received biometric and/or login credentials are valid, the example event sequence may continue as illustrated. If one or more of the biometrics and/or login credentials are not valid, client computing device 170 may generate, display and/or transmit one or more error messages and the example event sequence may end.

At step 220, client computing device 170 may generate authentication response data. In some examples, the authentication response data may include username input, password input, one-time passcode input, personal identification number (PIN) input, fingerprint input, voice or speech input, and/or other input (which may, e.g., have been received by client computing device 170), as well as raw biometric data and/or validation data indicating that the captured biometric data and/or login credentials were locally validated by the client computing device 170. For instance, based on validating the biometric data and/or login credentials (e.g., based on pre-stored information, baseline data patterns, and the like), client computing device 170 may generate authentication response data. In step 221, the generated authentication response data may be transmitted from the client computing device 170 to the authentication computing platform 110.

In some examples, transmitting the authentication response data may cause the authentication computing platform 110 to validate the authentication response data in step 222. For instance, authentication computing platform 110 may validate the authentication response data by analyzing the data and/or comparing the received data to pre-stored authenticating data. At step 223, in response to validating the authentication response data, the authentication computing platform 110 may generate an instruction, command or signal connecting the client computing device 170 to a client interface computing platform 120 configured to generate content for the application executing on the client computing device 170.

Figure 2E:
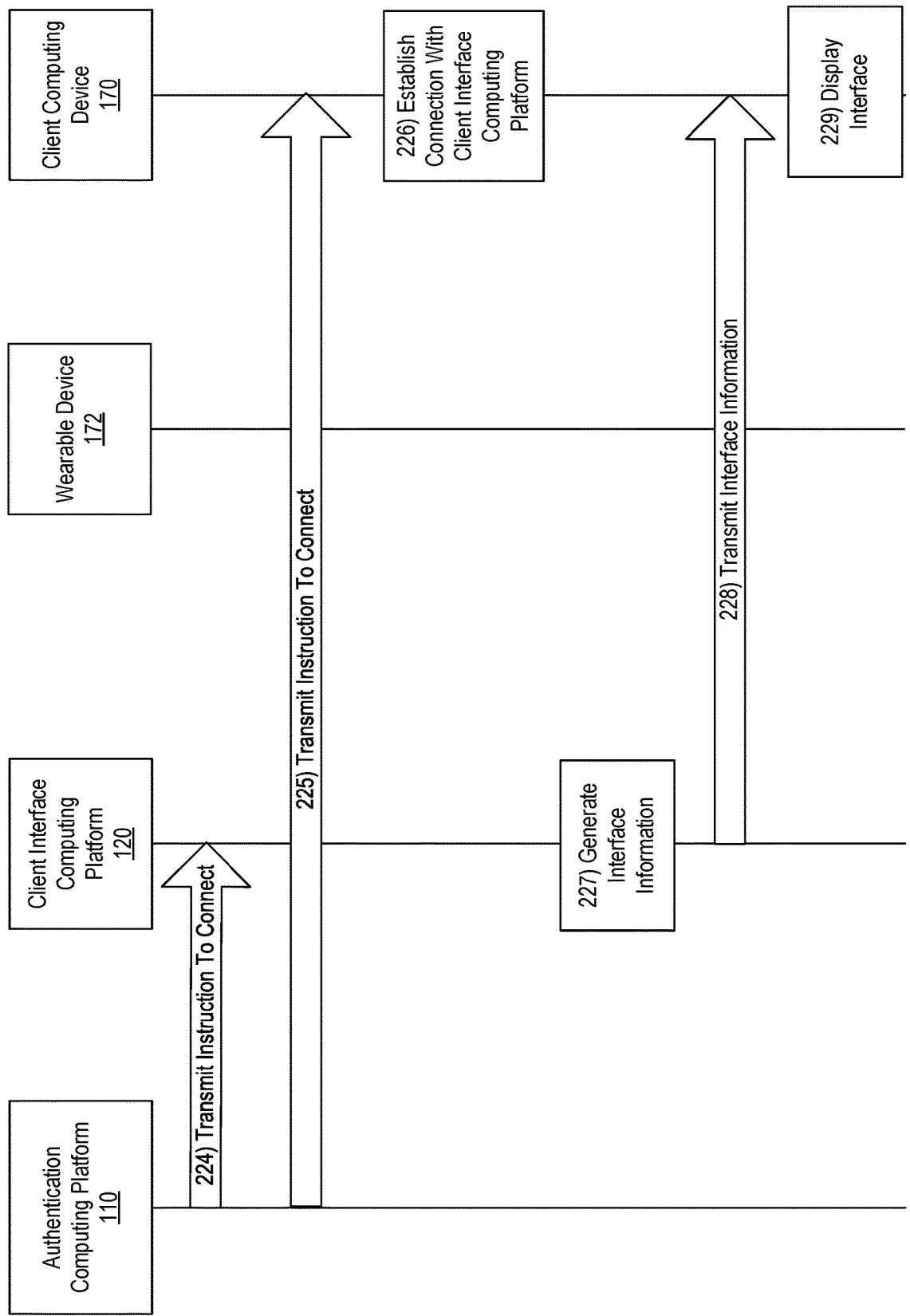

With reference to FIG. 2E, the instruction to connect the client computing device 170 to the client interface computing platform 120 may be transmitted at step 224 (e.g., from the authentication computing platform 110 to the client interface computing platform 120) and 225 (e.g., from the authentication computing platform 110 to the client computing device 170). At step 226, the client computing device 170 may establish a connection with the client interface computing platform 120. For instance, the client computing device 170 may establish a wireless network connection with the client interface computing platform 120.

Figure 8:
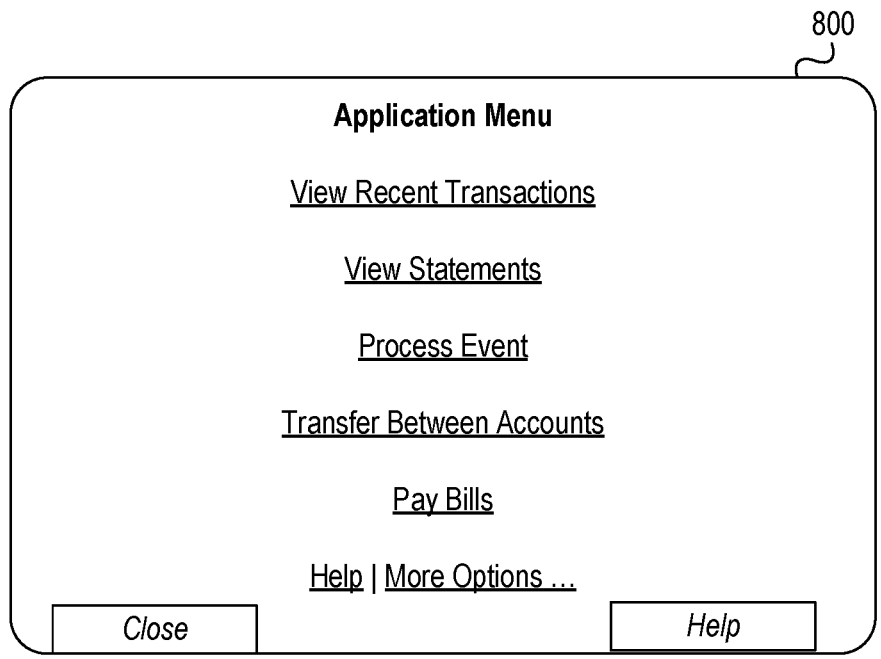
FIG. 8 illustrates one example user interface that may be displayed in accordance with one or more aspects described herein.

At step 227, client interface computing platform 120 may generate and/or configure application user interface information (which may, e.g., include user interface templates, user interface layouts, user interface content data, and/or other information). At step 228, client interface computing platform 120 may transmit the application interface information to the client computing device 170. At step 229, client computing device 170 may receive the application user interface information generated by the client interface computing platform 120 and may display or present one or more application user interfaces (e.g., based on the information received from the client interface computing platform 120). For example, the client computing device 170 may present or display, using the application executing on the client computing device 170, one or more application user interfaces based on the user interface information received from the client interface computing platform 120. One example user interface is shown in FIG. 8 and will be discussed more fully herein.

FIGS. 3A-3H depict an illustrative event sequence for implementing and using a system for preventing unauthorized access to systems by implementing multi-factor and advanced biometric authentication functions according to aspects described herein. The events shown in the illustrative event sequence are merely one example sequence and additional events may be added, or events may be omitted, without departing from the invention.

Figure 3B:
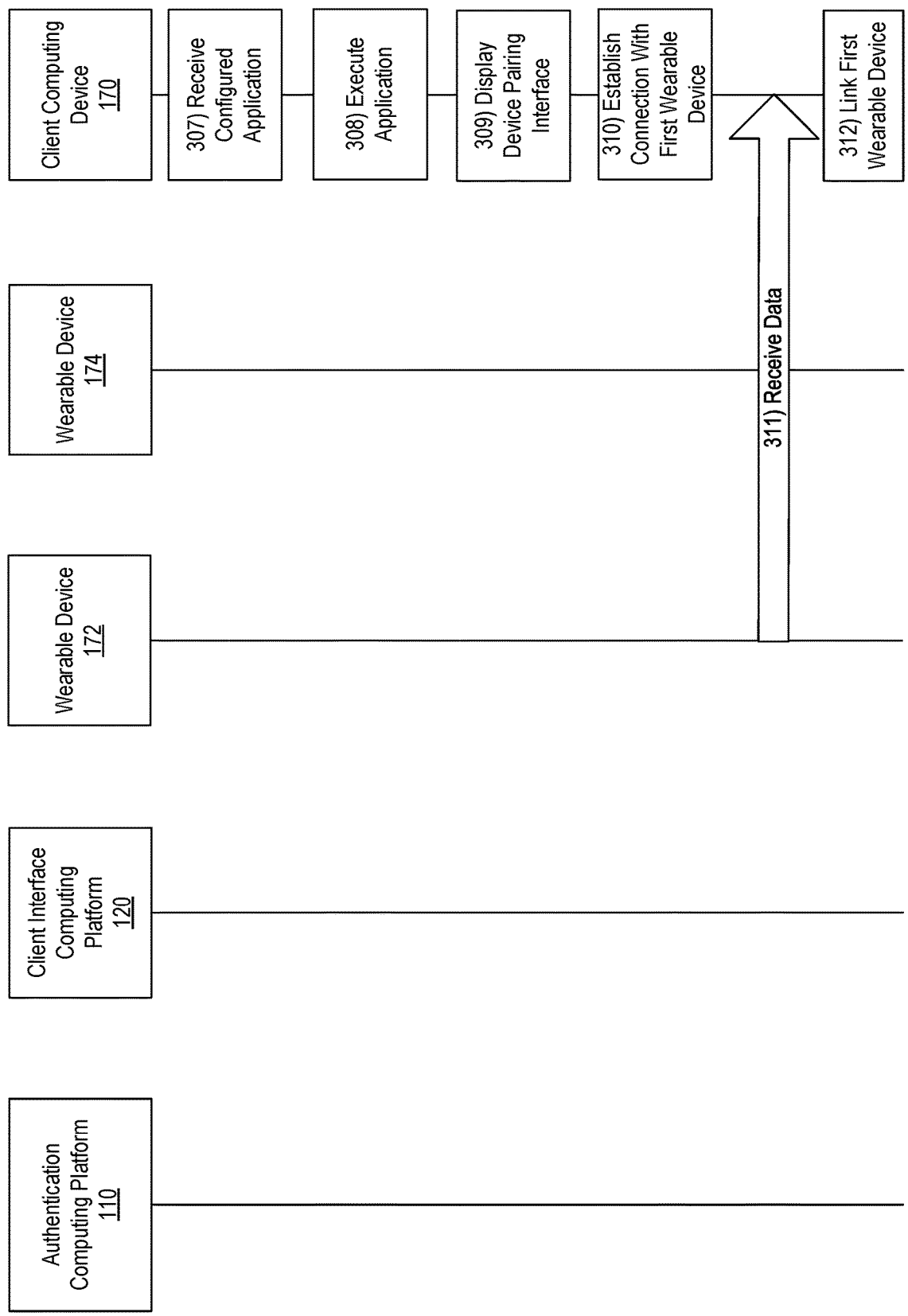

Referring to FIG. 3A, at step 301, a request to register a device, such as a client computing device 170, 175, may be received by the computing device 170. Although device 170 is shown and described throughout FIGS. 3A-3H, device 175 or other similar client computing devices may be used without departing from the invention.

At step 302, the request may be transmitted to an authentication computing platform 110. At step 303, the registration request may be received by the authentication computing platform 110. At step 304, and in response to receiving the request for registration, the authentication computing platform 110 may load a user profile linked to client computing device 170 and/or generate a user profile if one does not already exist. In generating a user profile, authentication computing platform 110 may, in some examples, store and/or update a device identifier for the client computing device 170 and/or other information associated with the client computing device 170.

At step 305, the authentication computing platform 110 may configure a copy of an application for client computing device 170 based on the registration request received from client computing device 170. In some examples, authentication computing platform may configure a copy of a mobile banking application for client computing device 170. At step 306, the authentication computing platform 110 may transmit the configured application to client computing device 170.

With reference to FIG. 3B, at step 307, client computing device 170 may receive the configured application from the authentication computing platform 110. For example, prior to receiving input requesting to login to a user account associated with the application (which may, e.g., be installed on the computing device, e.g., client computing device 170) client computing device 170 may receive, via a communication interface (which may, e.g., be a network interface configured to support communication between client computing device 170 and one or more networks (e.g., network 190, network 195, or the like)), from authentication computing platform 110 the application. In addition, the application received from the authentication computing platform 110 may be configured (e.g., at step 205) by the authentication computing platform for the client computing device 170.

At step 308, client computing device 170 may execute or launch the configured application. For example, at step 308, based on receiving the application from the authentication computing platform 110, client computing device 170 may execute or launch the application. At step 309, client computing device may display a device pairing interface. For example, at step 309, based on executing or launching the application, client computing device 170 may present (e.g., display on a display of client computing device 170) a device pairing interface. In some examples, such a device pairing interface may be presented by client computing device 170 via an operating system menu, while, in other examples, such a device pairing menu may be presenting by client computing device 170 via an application menu (e.g., the application executing on client computing device 170). In some examples, in presenting the device pairing user interface, client computing device 170 may display and/or otherwise present a graphical user interface. One example graphical user interface is shown in FIG. 7 and will be discussed more fully herein.

At step 310, client computing device 170 may establish a connection with one or more wearable devices 172, 174. For instance, at step 310, client computing device 170 may establish a first wireless data connection to a first wearable device 172 of one or more linked wearable devices (e.g., wearable device 172, wearable device 174) to link the wearable device 172 to the client computing device 170. At step 311, data may be received from the first wearable device 172. In some examples, the data may include an identifier associated with the first wearable device 172. At step 312, the first wearable device 172 may be linked to the client computing device 170.

Figure 3C:
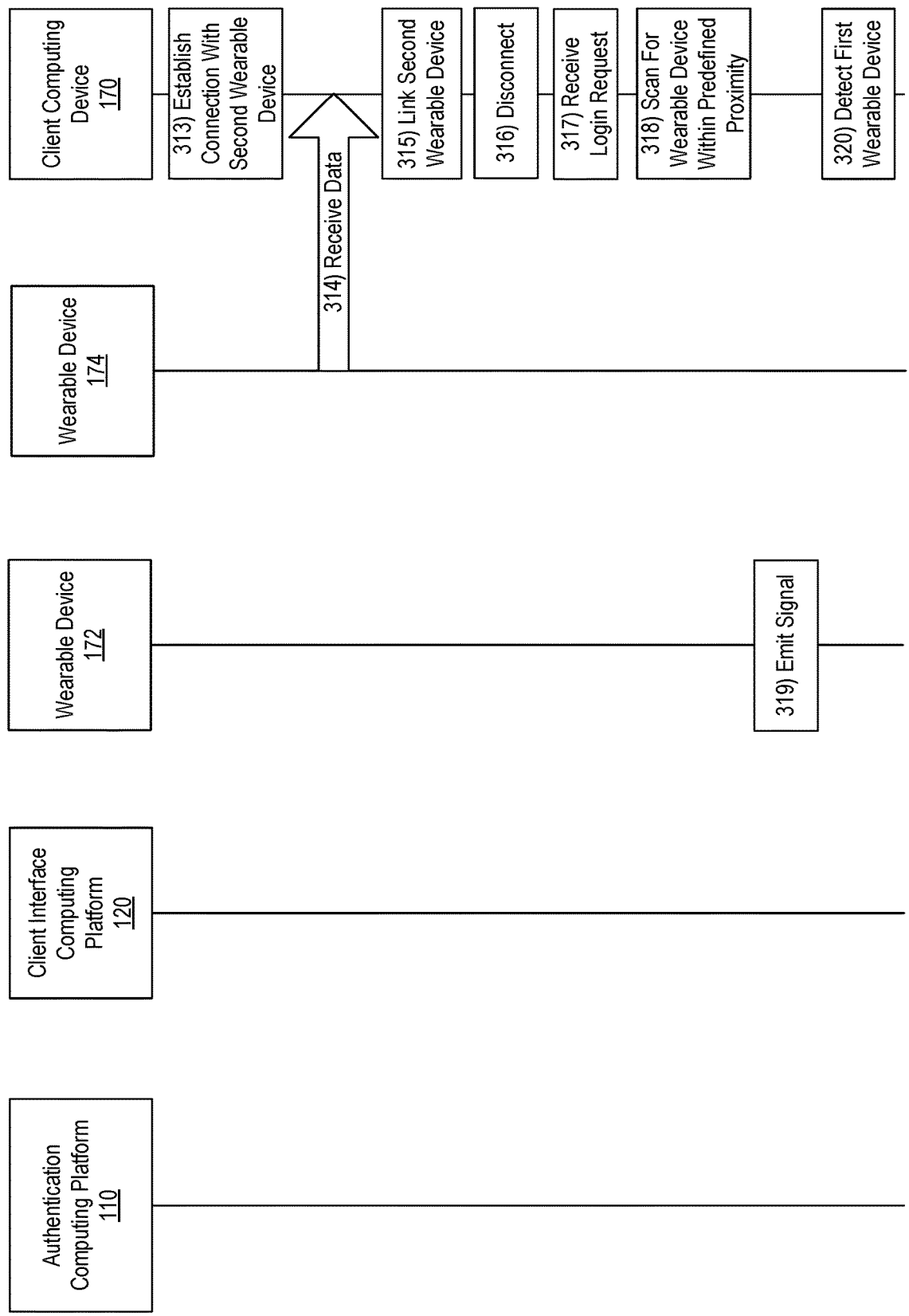

With reference to FIG. 3C, at step 313, the client computing device 170 may establish a connection with a second wearable device 174. For instance, the client computing device 170 may establish a second wireless connection with second wearable device 174. At step 314, data may be received from the second wearable device 174. In some examples, the data may include an identifier associated with the second wearable device 174. At step 315, the second wearable device may be linked to the client computing device 170.

In some examples, at step 316, the wireless network connections established between the client computing device 170 and the first wearable device 172 and/or the second wearable device 174, may be disconnected. In some examples, the connections may be reestablished as desired.

At step 317, a login request may be received by the client computing device 170 (e.g., user input may be received via the application executing on the client computing device 170). For instance, the client computing device 170 may receive user input requesting to login or otherwise access a user account associated with the application executing on the client computing device 170. In some examples, the login request may include user credentials, such as a username, password, personal identification number (PIN), biometric data such as a fingerprint or iris scan, or the like.

At step 318, in response to receiving the login request and, in some examples, without further user input, the client computing device 170 may execute a scan of a surrounding area to detect any wearable devices within a predefined proximity. For instance, near-field communication, Bluetooth communication, or the like, may be used to scan to detect a presence of one or more wearable devices within a predefined proximity of the client computing device 170. In step 319, the first wearable device 172 may emit a signal. Accordingly, at step 320, the client computing device may detect the signal emitted from the first wearable device 172.

Figure 3D:
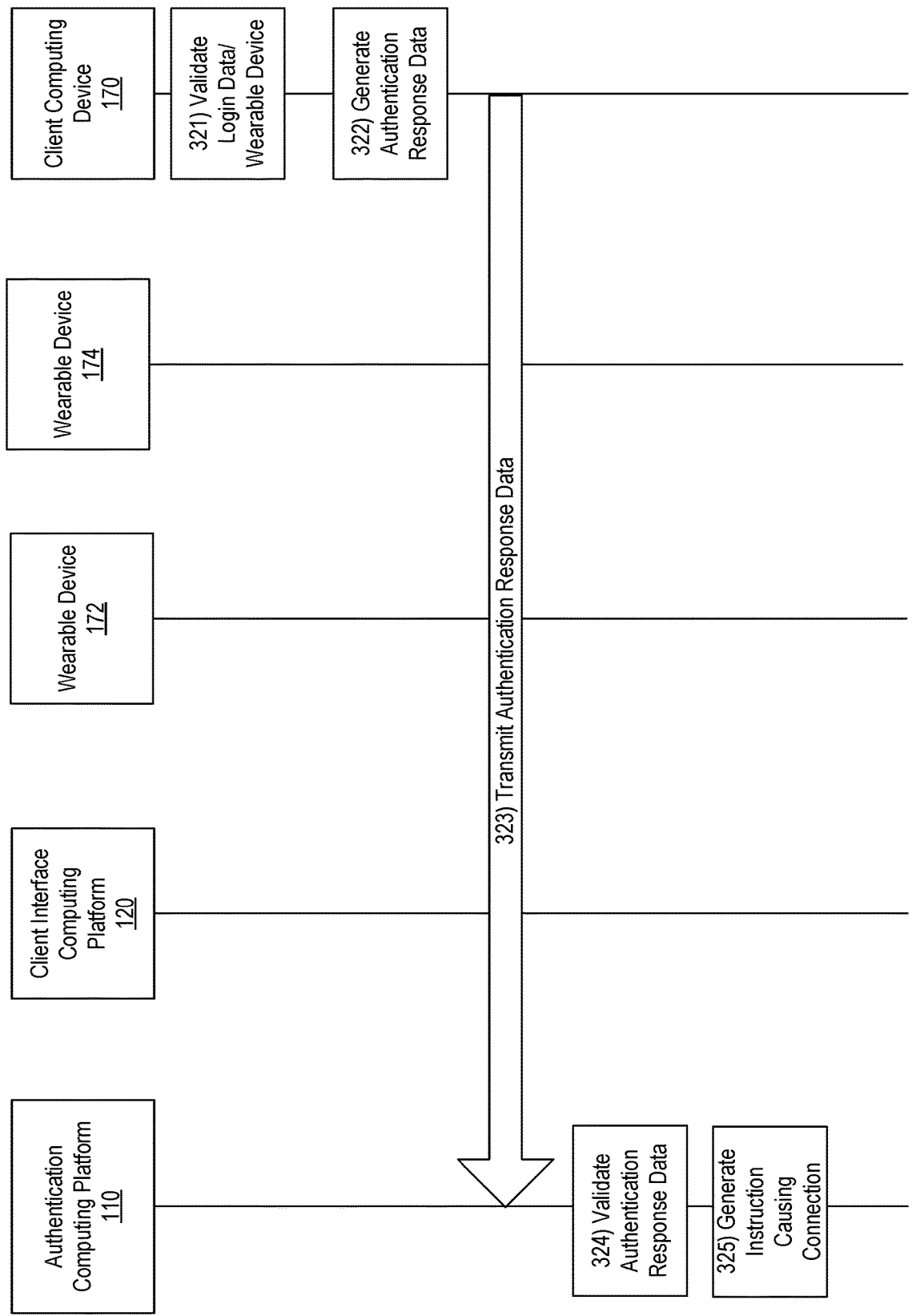

With reference to FIG. 3D, at step 321, the client computing device 170 may validate the received login credentials and/or wearable device. For instance, the client computing device may compare the received login credentials to pre-stored credentials. Further, the client computing device 170 may compare the detected wearable device (e.g., an identifier of the device) to pre-stored data associated with one or more wearable devices (e.g., linked wearable devices) to determine whether the wearable device is linked to the client computing device 170, application executing thereon, user associated therewith, or the like.

At step 322, authentication response data may be generated by the client computing device 170. In some examples, the authentication response data may include username input, password input, one-time passcode input, personal identification number (PIN) input, fingerprint input, and/or other input (which may, e.g., have been received by client computing device 170), as well as wearable device identifier, or other data and/or login credentials that were locally validated by the client computing device 170. For instance, based on validating the login credentials and presence and status of the wearable device (e.g., identifier, whether linked, and the like) (e.g., based on pre-stored information, and the like), client computing device 170 may generate authentication response data. In step 323, the generated authentication response data may be transmitted from the client computing device 170 to the authentication computing platform 110.

In some examples, transmitting the authentication response data may cause the authentication computing platform 110 to validate the authentication response data in step 324. For instance, authentication computing platform 110 may validate the authentication response data by analyzing the data and/or comparing the received data to pre-stored authenticating data. At step 325, in response to validating the authentication response data, the authentication computing platform 110 may generate an instruction, command or signal connecting the client computing device 170 to a client interface computing platform 120 configured to generate content for the application executing on the client computing device 170.

Figure 3E:
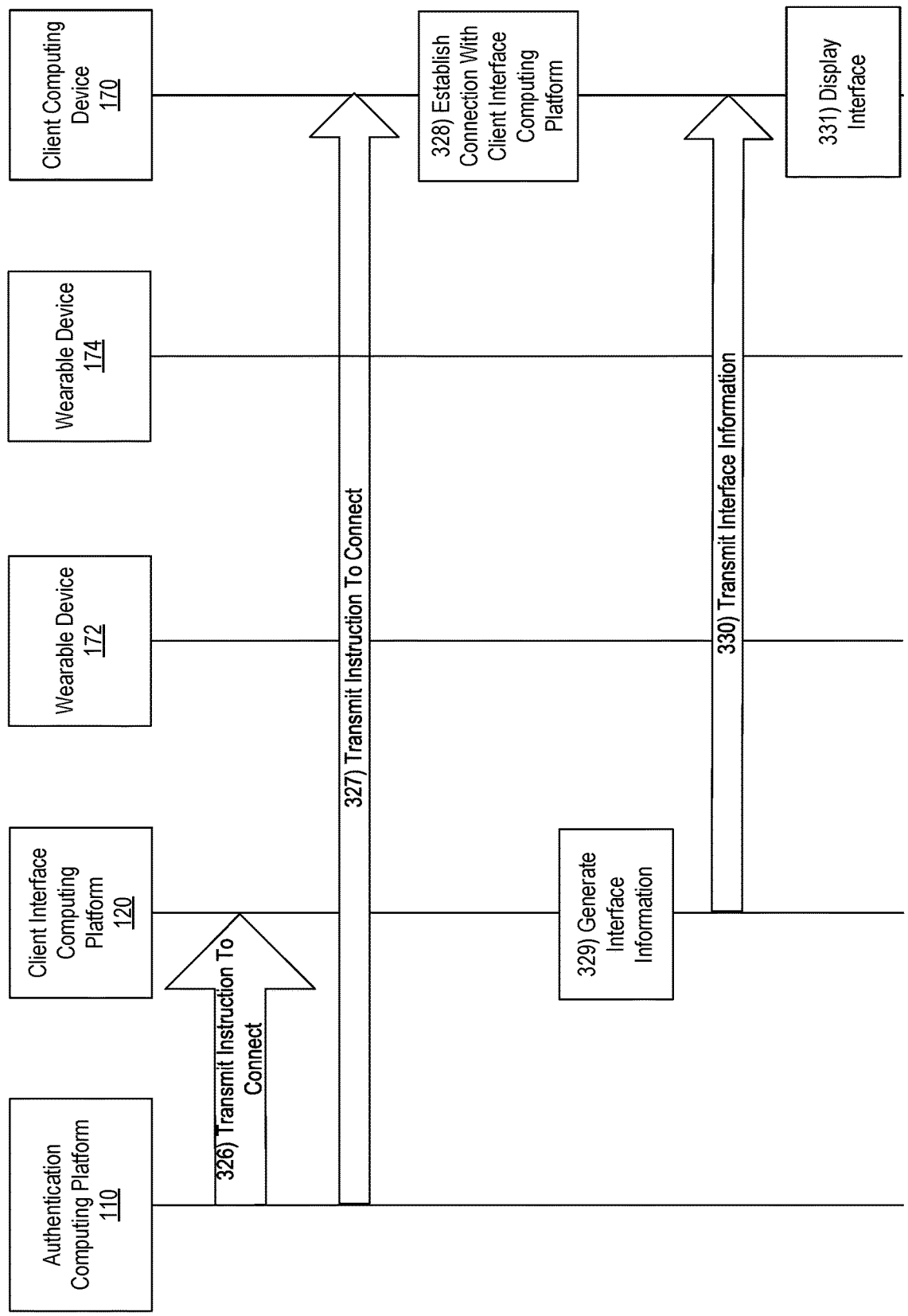

With reference to FIG. 3E, the instruction to connect the client computing device 170 to the client interface computing platform 120 may be transmitted at step 326 (e.g., from the authentication computing platform 110 to the client interface computing platform 120) and 327 (e.g., from the authentication computing platform 110 to the client computing device 170). At step 328, the client computing device 170 may establish a connection with the client interface computing platform 120. For instance, the client computing device 170 may establish a wireless network connection with the client interface computing platform 120.

At step 329, client interface computing platform 120 may generate and/or configure application user interface information (which may, e.g., include user interface templates, user interface layouts, user interface content data, and/or other information). At step 330, client interface computing platform 120 may transmit the application interface information to the client computing device 170. At step 331, client computing device 170 may receive the application user interface information generated by the client interface computing platform 120 and may display or present one or more application user interfaces (e.g., based on the information received from the client interface computing platform 120). For example, the client computing device 170 may present or display, using the application executing on the client computing device 170, one or more application user interfaces based on the user interface information received from the client interface computing platform 120.

Figure 3F:
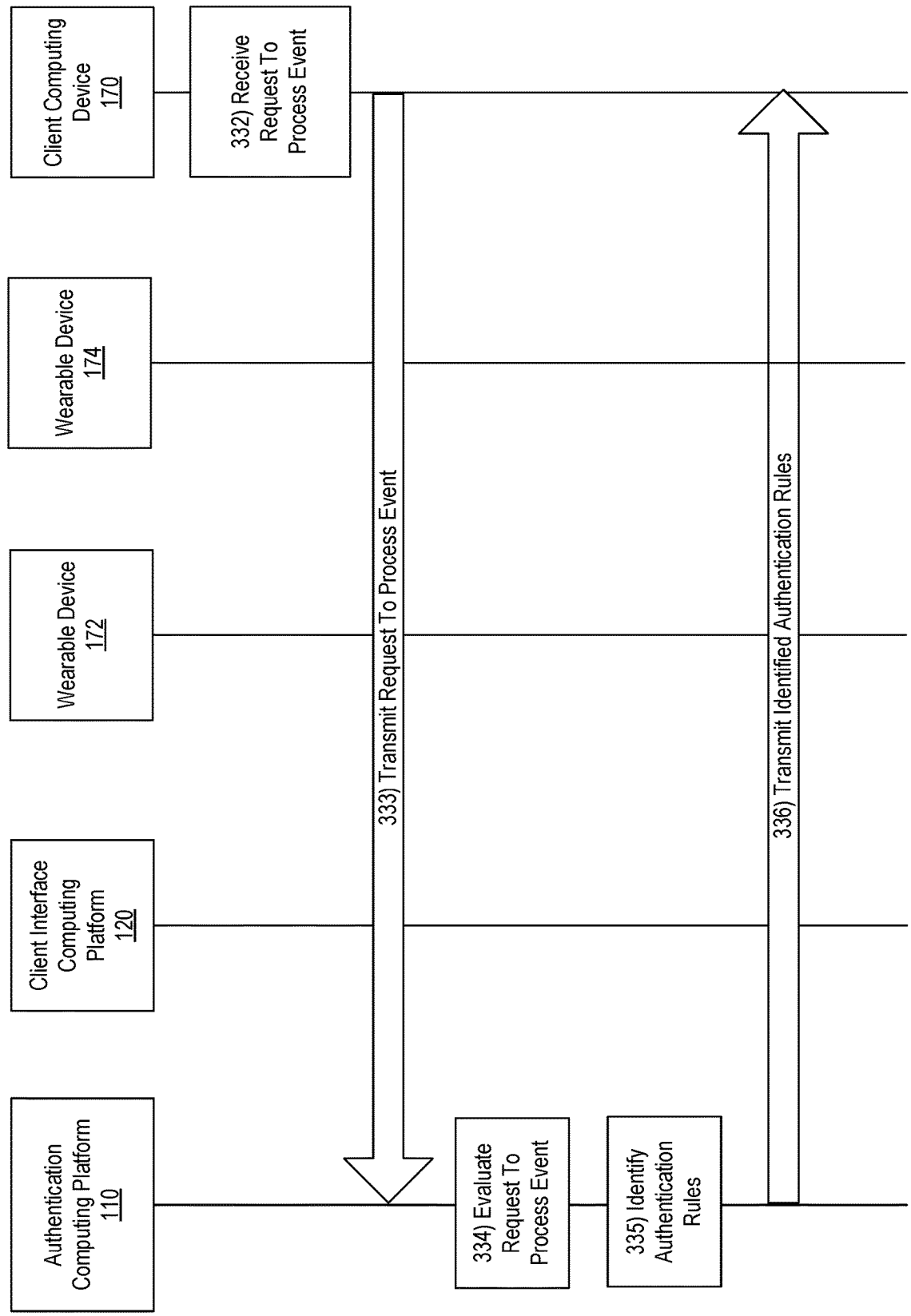

With reference to FIG. 3F, at step 332, a request to process an event may be received by the client computing device 170. For instance, the client computing device 170 may receive user input via the application executing on the client computing device 170 (e.g., one or more user interfaces displayed via the application) requesting processing of an event, such as a transaction, request, or other event. At step 333, the request to process the event may be transmitted to the authentication computing platform 110 for evaluation. In some examples, the request to process the event may include additional event details, such as an event type, amount of event, parties associated with the event, and the like.

At step 334, the request to process the event may be received by the authentication computing platform 110 and may be evaluated. For instance, the additional event details may be analyzed to determine one or more event parameters. In some examples, the event parameters may be a type of event, amount of event, and the like. These event parameters may be compared to one or more pre-stored thresholds to identify, in step 335, authentication rules to apply when processing the request. For example, if a type of transaction meets a first parameter, a first set of rules may be identified while, if the type meets a second parameter, a second, different set of rules may be identified. Similarly, if the amount of the transaction is above a threshold, a first set of rules may be identified. If the amount is at or below the threshold, a second, different set of rules may be identified.

In some examples, the identified rules may include requirements for further authentication of a user prior to processing the event. For example, detection of a single wearable device within proximity of the client computing device 170 may be sufficient for some types of events or amounts, while detection of at least two devices within proximity may be required to process other types or amounts.

At step 336, the identified rules may be transmitted to the client computing device 170.

Figure 3G:
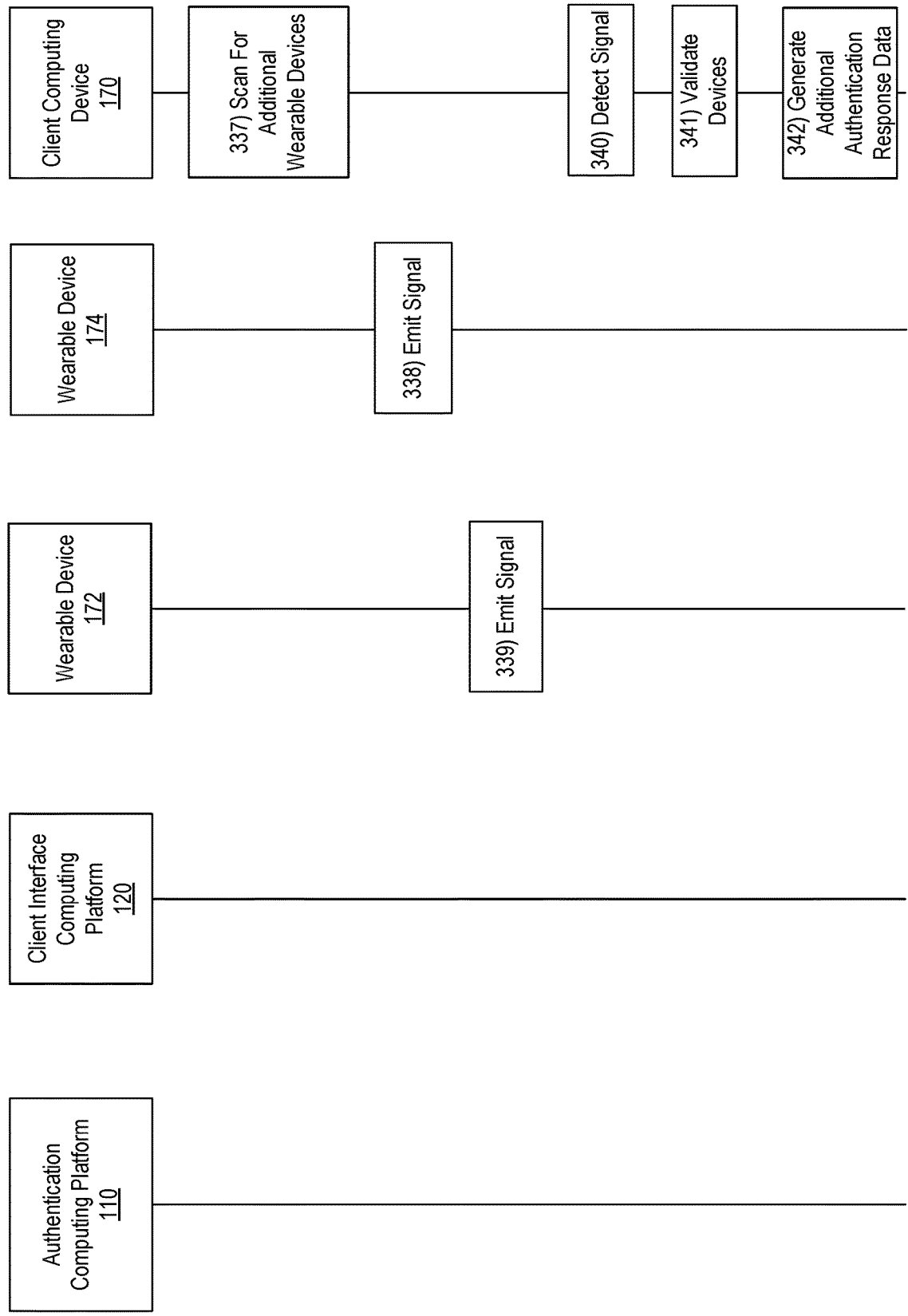

With reference to FIG. 3G, the identified rules may be received by the client computing device 170 and, based on the identified rules, additional actions may be taken to authenticate a user prior to processing the requested event. For instance, at step 337, the client computing device 170 may scan for additional wearable devices within proximity of the client computing device 170. At step 338, second wearable device 174 may emit a signal and, at step 339, first wearable device 172 may emit a signal. At step 340, the signals emitted by the first wearable device 172 and the second wearable device 174 may be detected by the client computing device 170. At step 341, the first and second wearable devices 172, 174 may be validated by the client computing device 170. For instance, the client computing device 170 may compare identifiers associated with each wearable device 172, 174 to pre-stored data to confirm that the wearable devices 172, 174, are linked to the client computing device 170, application executing thereon, are associated with a user associated therewith, or the like.

At step 342, and based on validating the two devices 172, 174, additional authentication response data may be generated. The additional authentication response data may include identifiers associated with each wearable device, validation information, and the like.

Figure 3H:
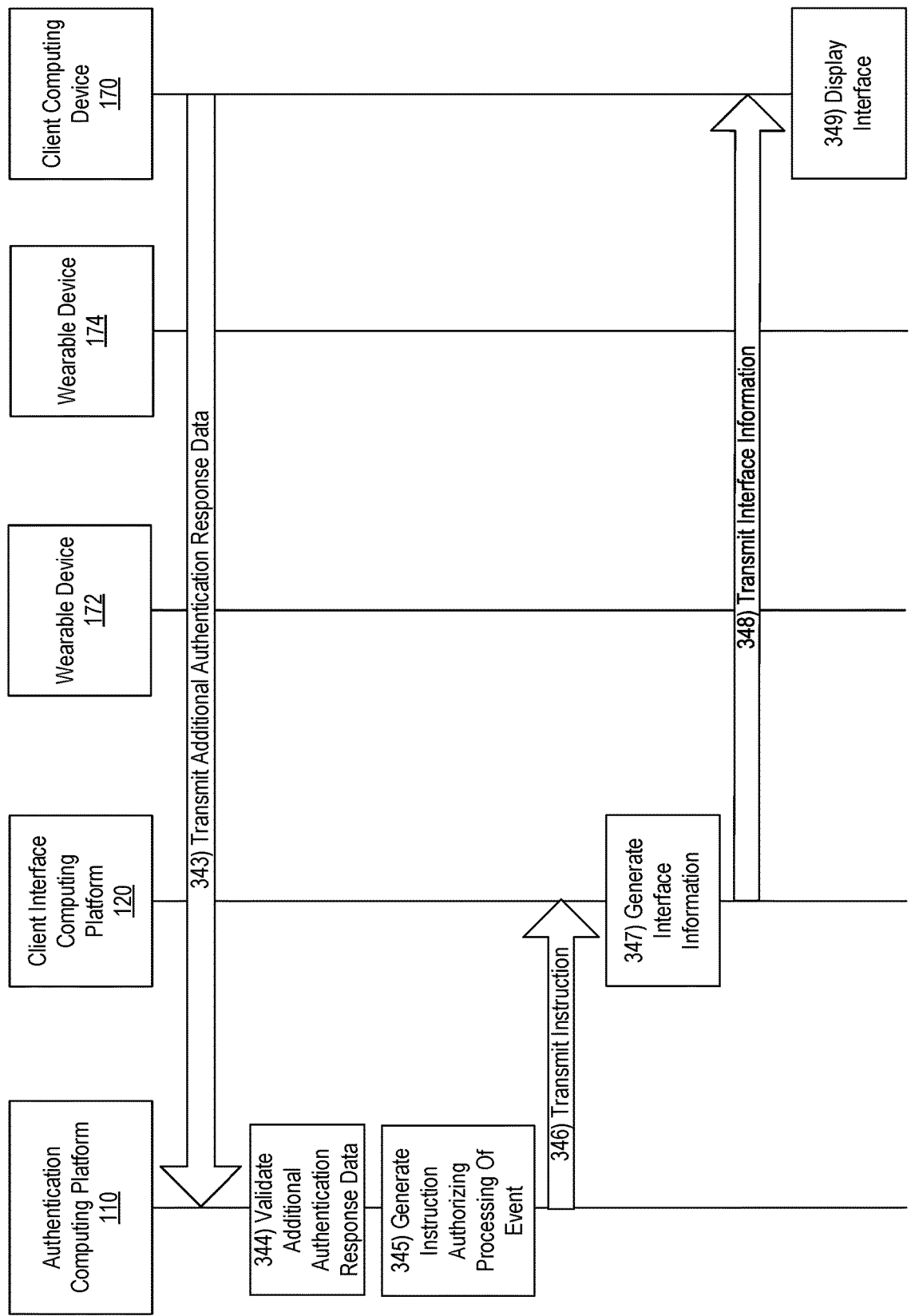

With reference to FIG. 3H, at step 343, the additional authentication response data may be transmitted from the client computing device 170 to the authentication computing platform 110. In some examples, transmitting the authentication response data may cause the authentication computing platform 110 to validate the additional authentication response data in step 344. For instance, authentication computing platform 110 may validate the additional authentication response data by analyzing the data and/or comparing the received data to pre-stored authenticating data. At step 345, in response to validating the additional authentication response data, the authentication computing platform 110 may generate an instruction, command or signal authorizing processing of the event. At step 346, the instruction, command or signal may be transmitted to the client interface computing platform 120 configured to generate content for the application executing on the client computing device 170.

At step 347, interface information (e.g., for processing the requested event) may be generated and/or configured by the client interface computing platform 120. For instance, client interface computing platform 120 may generate and/or configure application user interface information (which may, e.g., include user interface templates, user interface layouts, user interface content data, and/or other information). At step 348, client interface computing platform 120 may transmit the application interface information to the client computing device 170. At step 349, client computing device 170 may receive the application user interface information generated by the client interface computing platform 120 and may display or present one or more application user interfaces (e.g., based on the information received from the client interface computing platform 120). For example, the client computing device 170 may present or display, using the application executing on the client computing device 170, one or more application user interfaces based on the user interface information received from the client interface computing platform 120. One example user interface is shown in FIG. 8 and will be discussed more fully herein.

Figure 4:
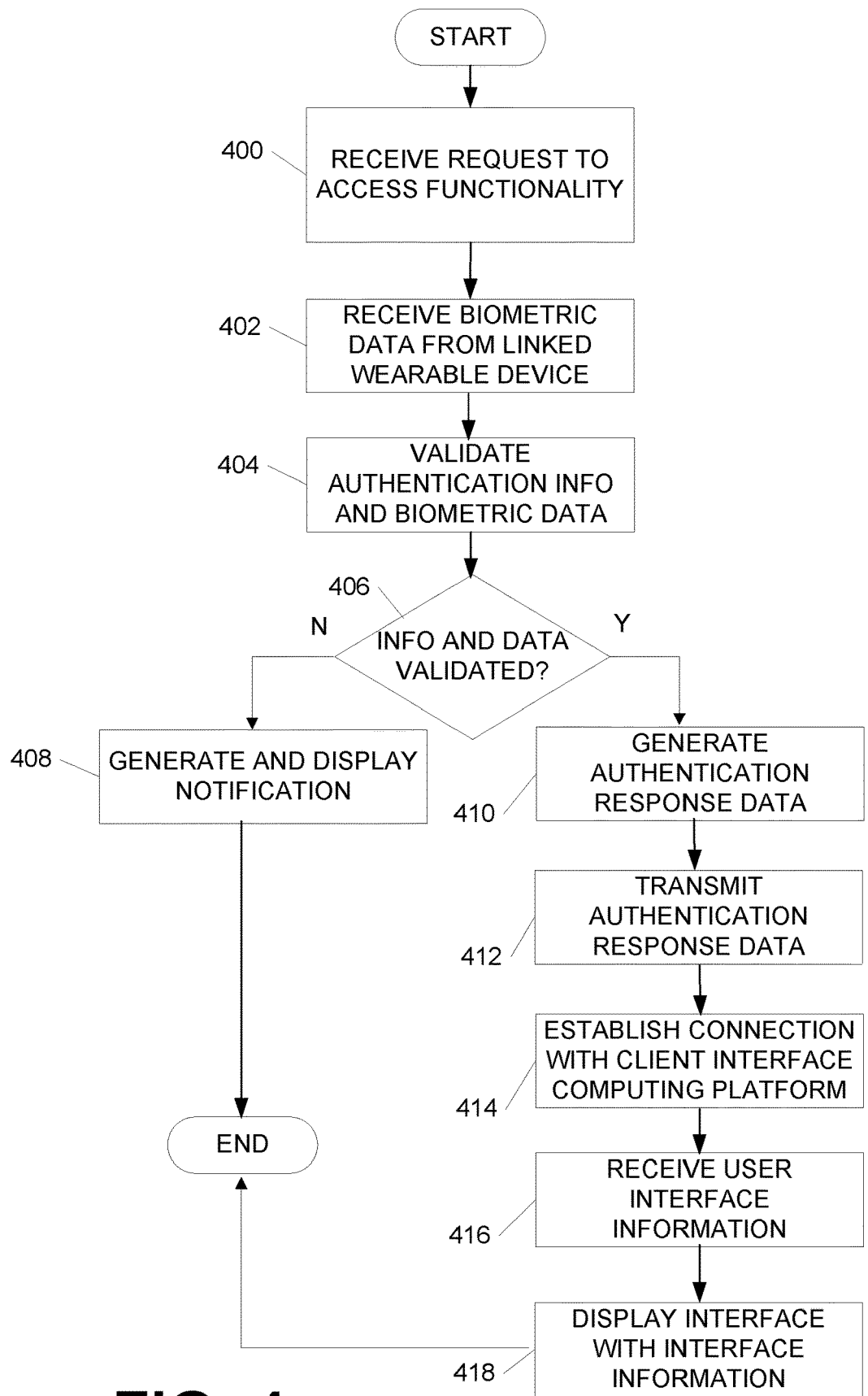
FIG. 4 depicts an illustrative method for implementing and using a system to perform advanced biometric authentication functions, according to one or more aspects described herein.

FIG. 4 illustrates one example method of using advanced biometric authentication functions to prevent unauthorized access to systems in accordance with one or more aspects described herein. At step 400, a request to access functionality associated with an account may be received. In some examples, the request may include login credentials, such as a username, password, personal identification number (PIN), basic biometric data such as fingerprint or iris scan, or the like.

At step 402, advanced biometric data may be received from, for example, a wearable device linked to the computing device receiving the request to login to a user account. As discussed herein, the advanced biometric data may include walking or running gait information, heart rate information, breathing information, and the like. In some examples, the advanced biometric data may be collected by the wearable device and transmitted in real-time or near real-time. In other examples, the advanced biometric data may be data captured during a predetermined window of time prior to the request. For instance, data from the previous one minute, five minutes, one hour, or the like, may be transmitted. In some examples, the advanced biometric data may be received from the wearable device without any additional user input (e.g., without additional authorization from the user, without prompting of the user, or the like).

At step 404, the received authentication information and advanced biometric data may be validated. For instance, the login credentials may be compared to pre-stored login credentials and the received biometric data may be compared to pre-stored based data patterns to validate the credentials and biometric data.

At step 406, a determination may be made as to whether the received login information and advanced biometric data are validated. If not, at step 408 a notification indicating that the credentials and/or biometric data are not valid may be generated and displayed to a user.

If, at step 406, the credentials and advanced biometric data are validated, authentication response data may be generated at step 410. In some examples, the authentication response data may include an indication that the credentials and biometric data were locally validated, may include the login credentials, biometric data, and the like. At step 412, the authentication response data may be transmitted to, for example, authentication computing platform 110 for further validation.

Responsive to further validation by the authentication computing platform 110, the computing device may establish a connection with the client interface computing platform 120 at step 414. For instance, the computing device 170 may establish a wireless network connection with the client interface computing platform 120.

At step 416, interface information may be received from the client interface computing platform 120. At step 418, one or more user interfaces may be displayed including the interface information received from the client interface computing platform 120.

Figure 5:
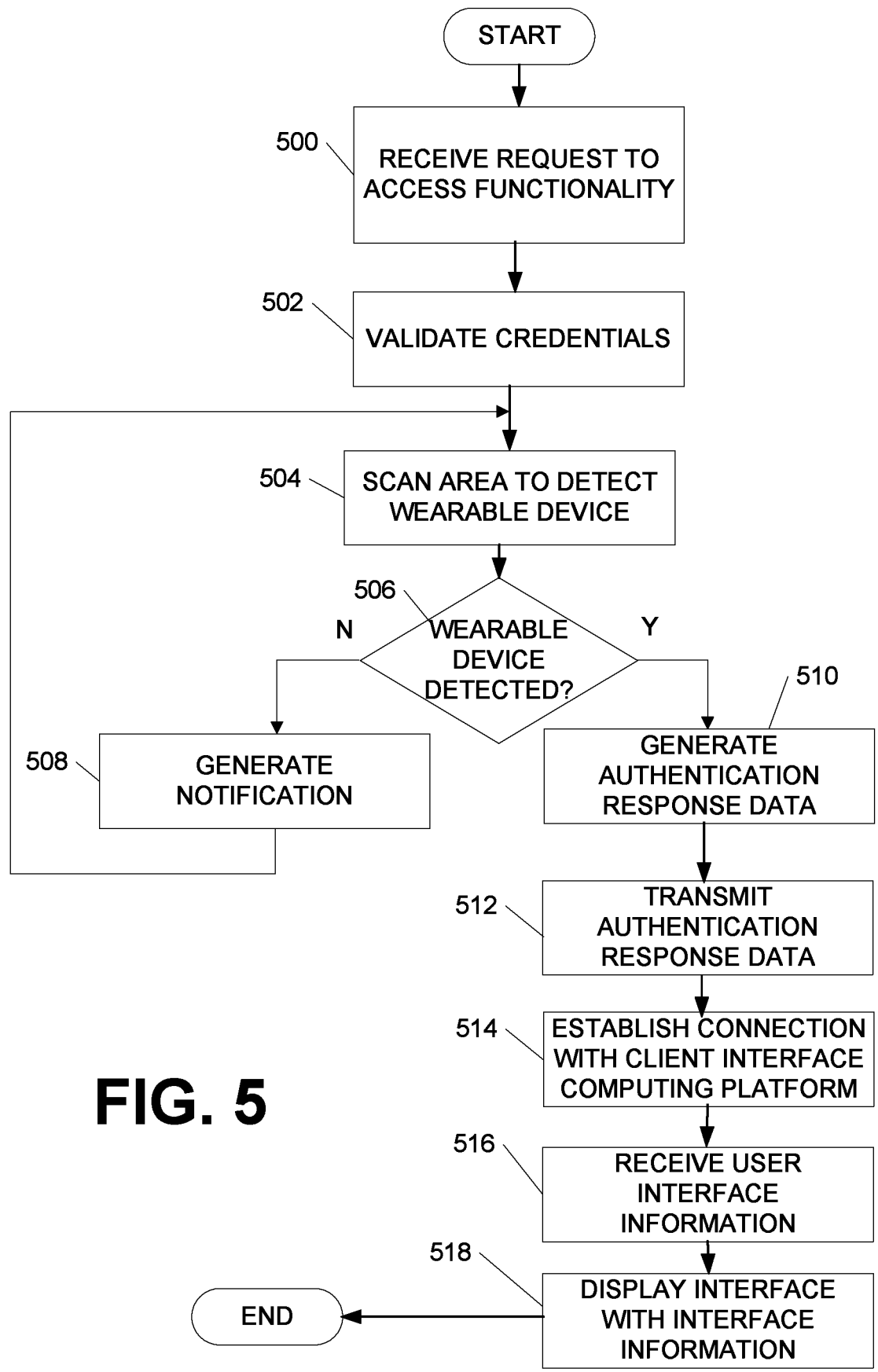
FIG. 5 depicts an illustrative method for implementing and using a system to perform multi-factor, hardware-based authentication functions in accordance with one or more aspects described herein.

FIG. 5 illustrates one example method of using multi-factor hardware authentication functions to prevent unauthorized access to systems in accordance with one or more aspects described herein. At step 500, a request to access functionality associated with an application may be received. In some examples, the request may include login credentials, such as a username, password, personal identification number (PIN), basic biometric data such as a fingerprint, or the like.

At step 502, the received login credentials may be validated. For instance, the received login credentials may be compared to pre-stored login credentials to validate the credentials. If the credentials are validated, at step 504, the computing device 170 may scan to determine whether one or more wearable devices are within a predefined proximity of the computing device 170.

At step 506, a determination is made as to whether a wearable device is detected. If not, a notification may be generated at step 508 and the process may return to step 504 to scan for any additional wearable devices.

If, at step 506, a wearable device is detected, at step 510, authentication response data may be generated. In some examples, the authentication response data may include an indication that the credentials were locally validated, may include the login credentials, may include an identifier associated with the wearable device, and the like. At step 512, the authentication response data may be transmitted to, for example, authentication computing platform 110 for further validation.

Responsive to further validation by the authentication computing platform 110, the computing device 170 may establish a connection with the client interface computing platform 120 at step 514. For instance, the computing device 170 may establish a wireless network connection with the client interface computing platform 120.

At step 516, interface information may be received from the client interface computing platform 120. At step 418, one or more user interfaces may be displayed including the interface information received from the client interface computing platform 120.

Figure 6:
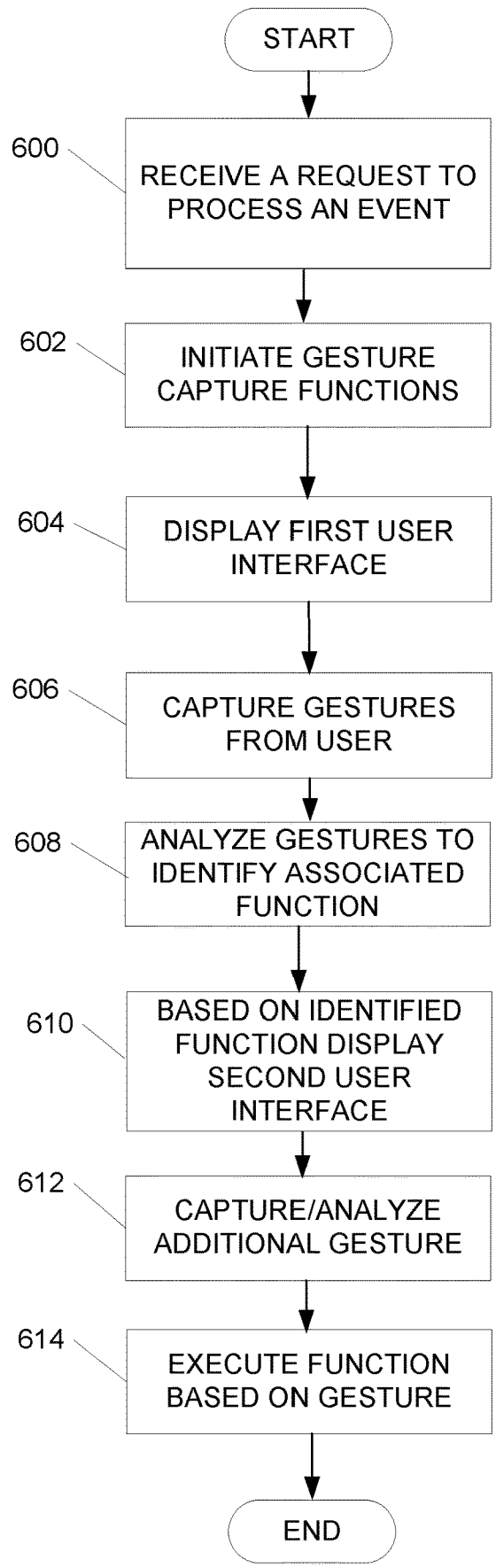
FIG. 6 depicts and illustrative method for implementing and using gestures to make selections from a user interface in accordance with one or more aspects described herein.

FIG. 6 illustrates one example method of using gestures to make selections from a user interface in accordance with one or more aspects described herein. For instance, in some examples, a user may use gestures (e.g., movement of a part of a body such as a finger, hand, arm, or the like) captured by a device, such as a camera or accelerometer tracking movement of, for example, a wearable device worn by a user, to make selections from a user interface (such as one or more user interfaces displayed using user interface data from client interface computing platform 120). In some arrangements, the user may use gestures to make selections from a user interface presented on a client computing device 170. Additionally or alternatively, the user may use gestures to make selections from a user interface presented via an automated teller machine (ATM), self-service kiosk, or the like.

At step 600, a computing device may receive a request to process an event. In some examples, processing an event may include completing a transaction, requesting customer service, or the like. At step 602, gesture capture functions may be initiated. For instance, the computing device may activate one or more gesture capture devices, such as a camera or other device configured to detect movement of the user or receive signals from a wearable device of a user (e.g., from an accelerometer or other sensing device arranged therein).

At step 604, the computing device may display a first user interface to the user. In some examples, the first user interface may be identified for display based on a type of event for which the request is received. At step 606, one or more gestures from the user may be captured. For instance, the user may be positioned in front of the computing device and may move his or her finger, hand, arm, or the like, to indicate a selection to be made from the user interface. The movement may be captured and analyzed. For instance, a camera may capture the image of the user's movement. In another example, accelerometer or other sensor data from a wearable device worn by the user may be transmitted from the wearable device to the computing device (e.g., using one or more linking or data transmission aspects discussed herein).

At step 608, the captured gestures may be analyzed to identify a selection made by the user. Based on the identified selection made by the user, the system may identify one or more additional user interfaces to present to the user at step 610. At step 612, additional gesture data may be captured and analyzed to identify a selection made by the user. Based on the selection made, the computing device may execute one or more functions associated with the identified selection made using the gesture.

FIG. 7 illustrates one example user interface that may be presented to a user for use in pairing a device, such as a wearable device. The user interface 700 may include a list of wearable devices detected by the client computing device (e.g., via one or more wireless communication interfaces of client computing device 170, such as via a Bluetooth interface of client computing device 170), one or more controls enabling a user of client computing device 170 to pair one or more of the wearable devices detected by the client computing device 170 with client computing device 170, and/or other user-selectable options.

FIG. 8 illustrates one example user interface that may be presented to a user upon being authenticated using one or more of advanced biometric data and/or multi-factor hardware authentication in accordance with one or more aspects described herein. The user interface 800 may include an application menu including interface data or information received from the client interface computing platform 120. As shown in FIG. 8, the interface 800 includes a mobile banking application menu and includes a plurality of user-selectable options which, when selected, enable client computing device 170 to perform one or more functions associated with the selected option.

As discussed herein, the arrangements described enable controlled access to secure systems by using multi-factor and/or advanced biometric authentication techniques and functions. Conventional systems often rely solely on user credentials, such as a username and password, for authentication. However, these credentials can often be obtained by unauthorized users to conduct unauthorized activity. Even in conventional systems in which traditional biometric data (e.g., fingerprint) is used to authenticate, ensuring the fingerprint is received from the actual user associated with the fingerprint can be difficult and can lead to unauthorized activity. Accordingly, the arrangements described herein provide improved security when accessing secure systems and data stored thereon by using multi-factor, hardware based authentication and/or advanced biometrics.

For instance, as discussed herein, one or more hardware devices, such as a wearable device, may be used to provide one or more additional factors of authentication for a user. For instance, a computing device may detect a presence of one or more wearable devices linked to the computing device in order to authenticate a user. Additionally or alternatively, advanced biometric data, such as walking gait, heart rate, blood pressure, and the like, may be received from the wearable device in order to provide additional authentication.

In some examples, using advanced biometric data for authentication may include receiving baseline data that is used to generate one or more baseline data patterns. In some arrangements, a minimum threshold amount of data (e.g., number of data points, data over a minimum time period, or the like) may be needed before the baseline data patterns can be generated.

Additionally or alternatively, in some examples, real-time or near real-time data may be collected by the wearable device and used to authenticate a user. In at least some arrangements, a minimum threshold amount of collected data (e.g., a minimum number of data points, data over a minimum time period, or the like) may be required before the data can be validated and/or used to authenticate the user.

In some examples, if the collected biometric data is not validated (e.g., does not match baseline data patterns) the system may request additional data from the wearable device, may request additional authentication information from the user, or the like.

Although some arrangements discussed herein relate to authentication or providing access based on data from one wearable device, in some examples, two or more wearable devices (e.g., wearable devices detected within a predefined proximity of a computing device) may be required in order to access an application, select functionality, and the like. The two or more wearable devices may be different types of wearable devices.

Further, although one example of authentication rules discussed herein includes requiring more than one wearable device in proximity to the computing device in order to process an event, various other types of rules may be used without departing from the invention. For instance, another example set of authentication rules may include requiring detection of a particular type of wearable device to process a particular type of event. For instance, in some examples, the authentication rules may require that a wrist-borne wearable device, such as a fitness tracker, watch, or the like, may be required to process events of a certain type (e.g., withdrawals over a certain threshold, change of address, or the like).

While several examples discussed herein include the client computing device 170 detecting a wearable device and performing additional functions, one or more aspects discussed herein may be used with an automated teller machine (ATM), self-service kiosk, or the like. For instance, upon receiving login credentials from a user, the ATM or other device may scan to determine whether one or more wearable devices is within a predefined proximity. If so, the user may be authenticated. Additionally or alternatively, advanced biometric data may be transmitted to the ATM or other self-service kiosk and analyzed to determine whether the received advanced biometric data matches one or more baseline data patterns associated with the user.

As discussed herein, the arrangements described provide for identification of a user requesting access or functionality as an authorized or unauthorized user and providing authentic or decoy information based on the identification. As discussed above, conventional systems may provide requested access or functionality based, in at least some examples, solely on a user having authentic credentials. However, unauthorized users often purchase or otherwise obtain authentic credentials and run an automated script to attempt to login or request access or functionality using each set of credentials in order to confirm authenticity of each set. Accordingly, unauthorized user may be able to access functionality by using the credentials obtained without the permission of an authorized user.

The arrangements described herein provide for identifying a user as unauthorized and providing decoy interfaces and/or other information in order to thwart any unauthorized activity and/or mitigate damage caused by the unauthorized activity. In some examples, a user may be identified as unauthorized based on GPS location data associated with the requesting computing device (e.g., velocity between locations for multiple logins), a number of attempted logins from a particular IP address, a time between login and logout (e.g., if less than a predetermined threshold then likely an unauthorized user testing credentials), number of failed login attempts from an IP address (e.g., if percentage of failed login attempts from IP address is greater than threshold then user is likely unauthorized), and the like. In some examples, unauthorized users may use multiple machines to attempt thousands or tens of thousands of logins. Accordingly, the server IP address may be identified and used to evaluate the attempted logins.

In some examples, unauthorized users may be identified based on browser characteristics. For instance, an automated script may execute similar to authentic browser behaviors. However, come characteristics of the browser may only mimic the authentic characteristics. For instance, header values, sequences, and the like, may be compared to authentic data to identify unauthorized users.

If a user is identified as unauthorized, a decoy interface may be provided. For instance, functionality associated with an authentic interface may be disabled and a decoy interface having a substantially similar appearance may be provided to the user. The decoy interface may be hosted by a same server as the authentic interface. The selections made by the user via the decoy interface may be collected and used to gather intelligence associated with the unauthorized user. For instance, data associated with types of actions or selections made, a computing device fingerprint, device characteristics, and the like. In some examples, the device characteristics may be used to prevent the identified device from logging in at a future time (e.g., the device may be placed on a deny list).

Although several examples described herein are directed to users attempting to access data via an online or mobile application, aspects described herein may be used to identify unauthorized users attempting to access functionality via a call center. For instance, an unauthorized user may contact a call center to request a password reset or one-time password to access an online or mobile application. In examples in which the user is an unauthorized user, a call center associate might not recognize the user as unauthorized since the user may have verifying information such as a date of birth, social security number, or the like (e.g., verifying information obtained without authorization from an authorized user). However, the arrangements discussed herein may be used to identify a user as unauthorized (e.g., based on a phone number from which a call is received, an IP address, or other identifying information). If so, a false one-time password, false challenge question, or the like, may be provided and the user may use the false password to login to a decoy interface in order to capture additional information about the unauthorized user.

Figure 9:
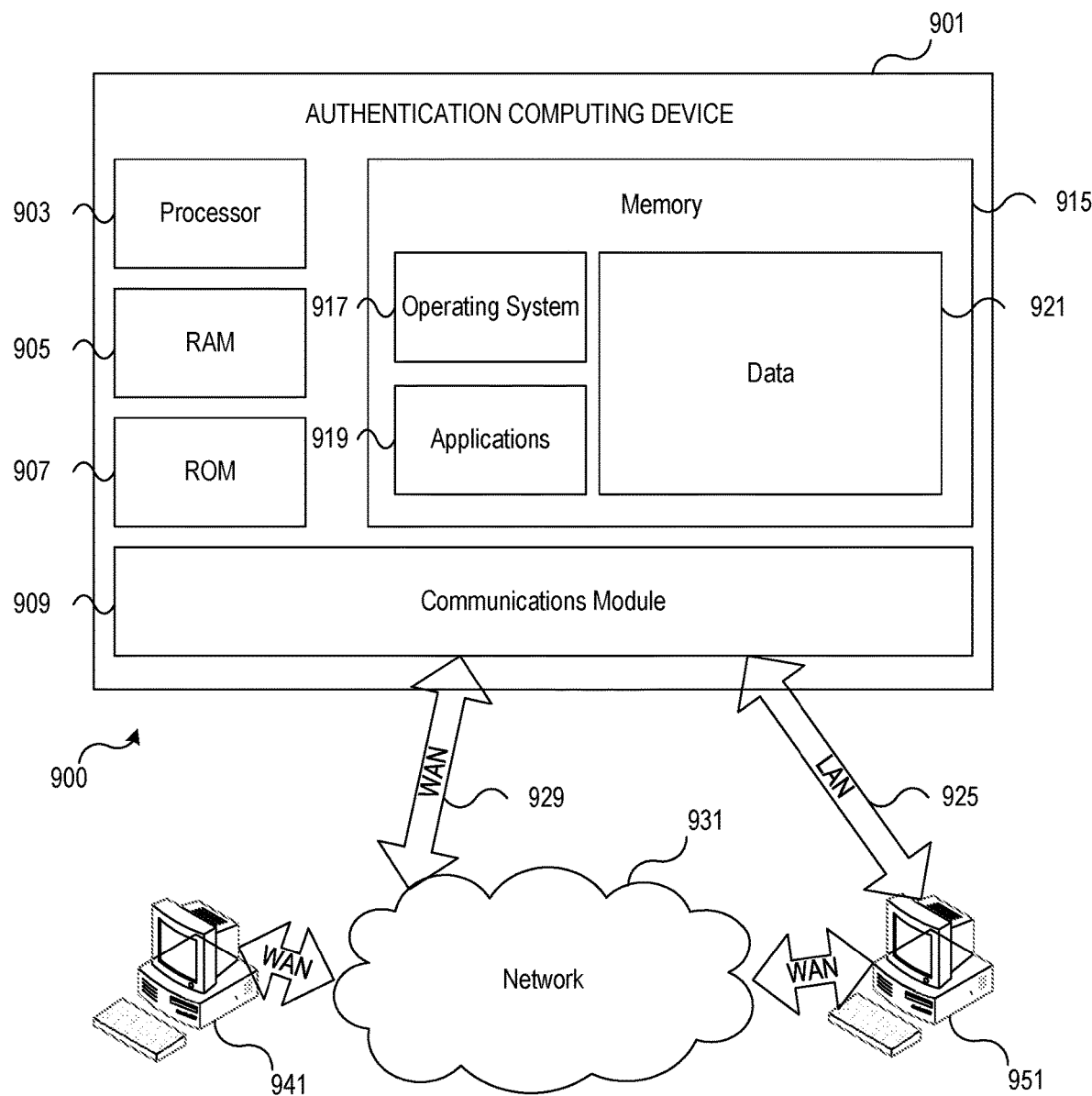
FIG. 9 illustrates one example operating environment in which various aspects of the disclosure may be implemented in accordance with one or more aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include authentication computing device 901 having processor 903 for controlling overall operation of authentication computing device 901 and its associated components, including Random Access Memory (RAM) 905, Read-Only Memory (ROM) 907, communications module 909, and memory 915. Authentication computing device 901 may include a variety of computer readable media. Computer readable media may be any available media that may be accessed by authentication computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 901.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on authentication computing device 901. Such a processor may execute computer-executable instructions stored on a computer-readable medium.

Software may be stored within memory 915 and/or storage to provide instructions to processor 903 for enabling authentication computing device 901 to perform various functions as discussed herein. For example, memory 915 may store software used by authentication computing device 901, such as operating system 917, application programs 919, and associated database 921. Also, some or all of the computer executable instructions for authentication computing device 901 may be embodied in hardware or firmware. Although not shown, RAM 905 may include one or more applications representing the application data stored in RAM 905 while authentication computing device 901 is on and corresponding software applications (e.g., software tasks) are running on authentication computing device 901.

Communications module 909 may include a microphone, keypad, touch screen, and/or stylus through which a user of authentication computing device 901 may provide input, and may also include one or more of a speaker for providing audio output and a video display device for providing textual, audiovisual and/or graphical output. Computing system environment 900 may also include optical scanners (not shown).

Authentication computing device 901 may operate in a networked environment supporting connections to one or more remote computing devices, such as computing devices 941 and 951. Computing devices 941 and 951 may be personal computing devices or servers that include any or all of the elements described above relative to authentication computing device 901.

The network connections depicted in FIG. 9 may include Local Area Network (LAN) 925 and Wide Area Network (WAN) 929, as well as other networks. When used in a LAN networking environment, authentication computing device 901 may be connected to LAN 925 through a network interface or adapter in communications module 909. When used in a WAN networking environment, authentication computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 10:
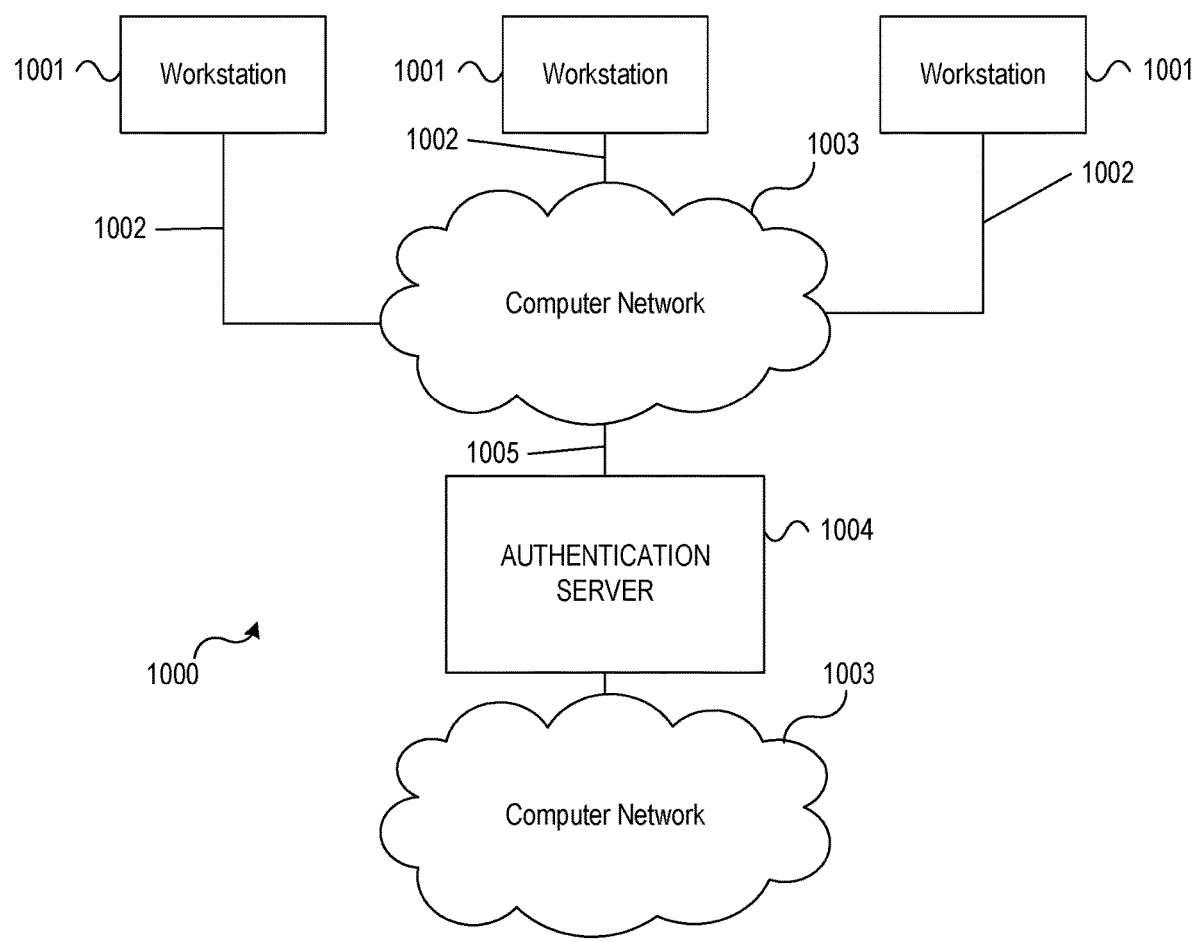
FIG. 10 depicts an illustrative block diagram of workstations and servers that may be used to implement the processes and functions of certain aspects of the present disclosure in accordance with one or more aspects described herein.

FIG. 10 depicts an illustrative block diagram of workstations and servers that may be used to implement the processes and functions of certain aspects of the present disclosure in accordance with one or more example embodiments. Referring to FIG. 10, illustrative system 1000 may be used for implementing example embodiments according to the present disclosure. As illustrated, system 1000 may include one or more workstation computers 1001. Workstation 1001 may be, for example, a desktop computer, a smartphone, a wireless device, a tablet computer, a laptop computer, and the like, configured to perform various processes described herein. Workstations 1001 may be local or remote, and may be connected by one of communications links 1002 to computer network 1003 that is linked via communications link 1005 to authentication server 1004. In system 1000, authentication server 1004 may be a server, processor, computer, or data processing device, or combination of the same, configured to perform the functions and/or processes described herein. Server 1004 may be used to receive requests to login or access functionality, validate data, authenticate a user, connect computing devices, and the like.

Computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 1002 and 1005 may be communications links suitable for communicating between workstations 1001 and authentication server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing device, comprising:
   at least one processor;
   a communication interface communicatively coupled to the at least one processor; and
   memory storing computer-readable instructions that, when executed by the at least one processor, cause the computing device to:
   receive a request to access functionality associated with an application installed on the computing device, the request to access functionality including authenticating information of a user input by a user;
   execute a scan of an area surrounding the computing device to detect any linked wearable devices within a predefined proximity of the computing device;
   detect, via the scanning, a first linked wearable device;
   validate the received authenticating information;
   based on the validating and the detecting, transmit, via the communication interface and to an authentication computing platform, authentication response data including the authenticating information input by the user and data related to the first linked wearable device, wherein transmitting the authentication response data causes the authentication computing platform to:
   validate the authentication response data; and
   based on validating the authentication response data, connect the computing device to a client interface computing platform configured to generate content for the application installed on the computing device;
   after connecting the computing device to the client interface computing platform, receive, from the client interface computing platform, application user interface information; and
   display one or more user interfaces based on the received application user interface information.

2. The computing device of claim 1, wherein the request to access functionality includes a request to login to a user account.

3. The computing device of claim 1, further including instructions that, when executed, cause the computing device to:
   receive a request to process an event having an event type;
   transmit the received request and event type to the authentication computing platform, wherein transmitting the received request and event type to the authentication computing platform causes the authentication computing platform to:
   analyze the event type to identify authentication rules to apply when processing events of the event type;
   transmit the identified authentication rules to the computing device;
   receive, from the authentication computing platform, the identified authentication rules; and
   execute the identified authentication rules.

4. The computing device of claim 3, wherein executing the authentication rules further includes:
   execute an additional scan of the area surrounding the computing device to detect at least two wearable devices.

5. The computing device of claim 4, further including instructions that, when executed, cause the computing device to:
   detect, based on the additional scan, the first linked wearable device and a second linked wearable device; and
   responsive to detecting the first linked wearable device and the second linked wearable device, processing the event.

6. The computing device of claim 4, further including instructions that, when executed, cause the computing device to:
   detect, based on the additional scan, only the first linked wearable device; and
   responsive to detecting only the first linked wearable device, denying processing of the event.

7. The computing device of claim 3, wherein executing the identified authentication rules further includes instructions that, when executed, cause the computing device to:
   identify a type of device of the first linked wearable device; and process the event having the event type in response to determining that the type of device of the first linked wearable device is a particular type of device.

8. A method, comprising:
at a computing device comprising at least one processor, memory, and a communication interface:
receive, by the at least one processor and via the communication interface, a request to access functionality associated with an application installed on the computing device, the request to access functionality including authenticating information of a user input by a user;
execute, by the at least one processor, a scan of an area surrounding the computing device to detect any linked wearable devices within a predefined proximity of the computing device;
detect, by the at least one processor and via the scanning, a first linked wearable device;
validate, by the at least one processor, the received authenticating information;
based on the validating and the detecting, transmit, by the at least one processor, via the communication interface and to an authentication computing platform, authentication response data including the authenticating information input by the user and data related to the first linked wearable device, wherein transmitting the authentication response data causes the authentication computing platform to:
validate the authentication response data; and
based on validating the authentication response data, connect the computing device to a client interface computing platform configured to generate content for the application installed on the computing device;
after connecting the computing device to the client interface computing platform, receive, by the at least one processor, via the communication interface and from the client interface computing platform, application user interface information; and
display one or more user interfaces based on the received application user interface information.

9. The method of claim 8, wherein the request to access functionality includes a request to login to a user account.

10. The method of claim 8, wherein the scan is performed without user input requesting the scan.

11. The method of claim 8, further including:
receive, by the at least one processor and via the communication interface, a request to process an event having an event type;
transmit, by the at least one processor and via the communication interface, the received request and event type to the authentication computing platform, wherein transmitting the received request and event type to the authentication computing platform causes the authentication computing platform to:
analyze the event type to identify authentication rules to apply when processing events of the event type;
transmit the identified authentication rules to the computing device;
receive, by the at least one processor, via the communication interface and from the authentication computing platform, the identified authentication rules; and
execute, by the at least one processor, the identified authentication rules.

12. The method of claim 11, wherein executing the authentication rules further includes:
executing, by the at least one processor, an additional scan of the area surrounding the computing device to detect at least two wearable devices.

13. The method of claim 12, further including:
detecting, by the at least one processor and based on the additional scan, the first linked wearable device and a second linked wearable device; and
responsive to detecting the first linked wearable device and the second linked wearable device, processing, by the at least one processor, the event.

14. The method of claim 12, further including:
detecting, by the at least one processor and based on the additional scan, only the first linked wearable device; and
responsive to detecting only the first linked wearable device, denying, by the at least one processor, processing of the event.

15. One or more non-transitory computer-readable media storing instructions that, when executed by a computing device comprising at least one processor, memory, and a communication interface, cause the computing device to:
receive a request to access functionality associated with an application installed on the computing device, the request to access functionality including authenticating information of a user input by a user;
execute a scan of an area surrounding the computing device to detect any linked wearable devices within a predefined proximity of the computing device;
detect, via the scanning, a first linked wearable device;
validate the received authenticating information;
based on the validating and the detecting, transmit, via the communication interface and to an authentication computing platform, authentication response data including the authenticating information input by the user and data related to the first linked wearable device, wherein transmitting the authentication response data causes the authentication computing platform to:
validate the authentication response data; and
based on validating the authentication response data, connect the computing device to a client interface computing platform configured to generate content for the application installed on the computing device;
after connecting the computing device to the client interface computing platform, receive, from the client interface computing platform, application user interface information; and
display one or more user interfaces based on the received application user interface information.

16. The one or more non-transitory computer-readable media of claim 15, wherein the request to access functionality includes a request to login to a user account.

17. The one or more non-transitory computer-readable media of claim 15, wherein the scan is performed without user input requesting the scan.

18. The one or more non-transitory computer-readable media of claim 15, further including instructions that, when executed, cause the computing device to:
receive a request to process an event having an event type;
transmit the received request and event type to the authentication computing platform, wherein transmitting the received request and event type to the authentication computing platform causes the authentication computing platform to:
analyze the event type to identify authentication rules to apply when processing events of the event type;
transmit the identified authentication rules to the computing device;

receive, from the authentication computing platform, the identified authentication rules; and execute the identified authentication rules.

19. The one or more non-transitory computer-readable media of claim 18, wherein executing the authentication rules further includes:

execute an additional scan of the area surrounding the computing device to detect at least two wearable devices.

20. The one or more non-transitory computer-readable media of claim 19, further including instructions that, when executed, cause the computing device to:

detect, based on the additional scan, the first linked wearable device and a second linked wearable device; and responsive to detecting the first linked wearable device and the second linked wearable device, processing the event.

21. The one or more non-transitory computer-readable media of claim 19, further including instructions that, when executed, cause the computing device to:

detect, based on the additional scan, only the first linked wearable device; and responsive to detecting only the first linked wearable device, denying processing of the event.

* * * * *